US008621981B2

(12) United States Patent
Rivera

(10) Patent No.: US 8,621,981 B2
(45) Date of Patent: *Jan. 7, 2014

(54) COFFEE MAKER

(76) Inventor: Adrian Rivera, Whittier, CA (US)

( * ) Notice: Subject to any disclaimer, the term of this patent is extended or adjusted under 35 U.S.C. 154(b) by 639 days.

This patent is subject to a terminal disclaimer.

(21) Appl. No.: 12/610,181

(22) Filed: Oct. 30, 2009

(65) Prior Publication Data

US 2011/0100229 A1    May 5, 2011

(51) Int. Cl.
*A47J 31/00* (2006.01)

(52) U.S. Cl.
USPC .......................................................... 99/286

(58) Field of Classification Search
USPC ............... 99/287, 286, 290, 295, 302 P, 307, 99/289 R, 302 R, 323
See application file for complete search history.

(56) References Cited

U.S. PATENT DOCUMENTS

| 2,433,815 | A |   | 12/1947 | LaForge |         |
|-----------|---|---|---------|---------|---------|
| 3,115,822 | A |   | 12/1963 | Totten  |         |
| 3,120,170 | A | * | 2/1964  | Garte   | 99/287  |
| 3,136,241 | A |   | 6/1964  | Price   |         |
| 3,199,682 | A |   | 8/1965  | Scholtz |         |
| 3,326,115 | A |   | 6/1967  | Karlen et al. | |
| 3,384,004 | A | * | 5/1968  | Perlman et al. | 99/289 R |
| 3,478,670 | A |   | 11/1969 | Fuqua   |         |
| 3,530,787 | A |   | 9/1970  | Litterio |        |
| 3,583,308 | A |   | 6/1971  | Williams |        |
| 3,599,557 | A |   | 8/1971  | Leal    |         |
| 3,607,297 | A |   | 9/1971  | Fasano  |         |
| 3,812,273 | A |   | 5/1974  | Schmidt |         |
| 3,844,206 | A |   | 10/1974 | Weber   |         |
| 4,036,121 | A |   | 7/1977  | Bieri   |         |
| 4,253,385 | A |   | 3/1981  | Illy    |         |
| 4,286,515 | A |   | 9/1981  | Baumann et al. | |
| 4,300,442 | A |   | 11/1981 | Martin  |         |
| 4,644,855 | A |   | 2/1987  | Woolman et al. | |
| 4,644,856 | A |   | 2/1987  | Borgmann |        |
| 5,123,335 | A |   | 6/1992  | Aselu   |         |
| 5,233,914 | A |   | 8/1993  | English |         |
| 5,325,765 | A |   | 7/1994  | Sylvan et al. |  |
| 5,335,589 | A |   | 8/1994  | Yerves et al. |  |
| 5,526,733 | A | * | 6/1996  | Klawuhn et al. | 99/287 |
| 5,582,730 | A |   | 12/1996 | Hugentobler |    |
| 5,676,041 | A |   | 10/1997 | Glucksman et al. | |
| 5,829,340 | A |   | 11/1998 | Yang    |         |
| 5,840,189 | A |   | 11/1998 | Sylvan et al. |  |
| 5,870,943 | A | * | 2/1999  | Levi et al. | 99/287 |
| 5,875,704 | A | * | 3/1999  | Levi et al. | 99/295 |
| 6,136,352 | A |   | 10/2000 | Silverstein et al. | |
| 6,189,438 | B1|   | 2/2001  | Bielfeldt et al. | |

(Continued)

FOREIGN PATENT DOCUMENTS

WO    WO 2005/092160 A1    10/2005

*Primary Examiner* — Reginald L Alexander
(74) *Attorney, Agent, or Firm* — Kenneth L. Green

(57) ABSTRACT

Coffee making apparatus and methods provide a tamped packing of loose ground coffee thereby obtaining richer flavor. The Coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

30 Claims, 19 Drawing Sheets

(56) References Cited

U.S. PATENT DOCUMENTS

| | | |
|---|---|---|
| 6,606,938 B2 | 8/2003 | Taylor |
| 6,655,260 B2 | 12/2003 | Lazaris et al. |
| 6,658,989 B2 | 12/2003 | Sweeney et al. |
| 6,740,345 B2 | 5/2004 | Cai |
| 6,832,542 B2 | 12/2004 | Hu et al. |
| 6,843,165 B2 | 1/2005 | Stoner et al. |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,131,369 B2 | 11/2006 | Gantt et al. |
| 7,320,274 B2 * | 1/2008 | Castellani ............... 99/295 |
| 7,730,829 B2 * | 6/2010 | Hammad ............... 99/295 |
| 7,946,217 B2 * | 5/2011 | Favre et al. ............... 99/295 |
| 8,047,127 B2 | 11/2011 | Lin |
| 2002/0148356 A1 | 10/2002 | Lazaris et al. |
| 2004/0118290 A1 | 6/2004 | Cai |
| 2006/0159815 A1 | 7/2006 | Crook et al. |
| 2006/0196364 A1 | 9/2006 | Kirschner |
| 2009/0229471 A1 | 9/2009 | Lun et al. |
| 2010/0083843 A1 * | 4/2010 | Denisart et al. ............... 99/295 |

* cited by examiner

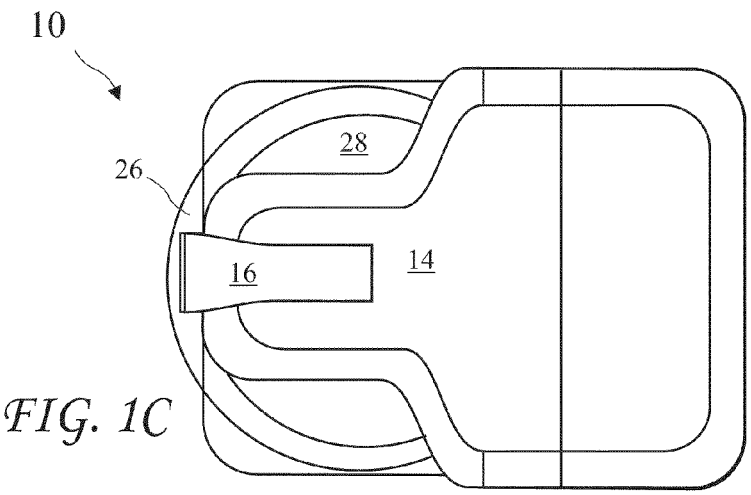
FIG. 1C
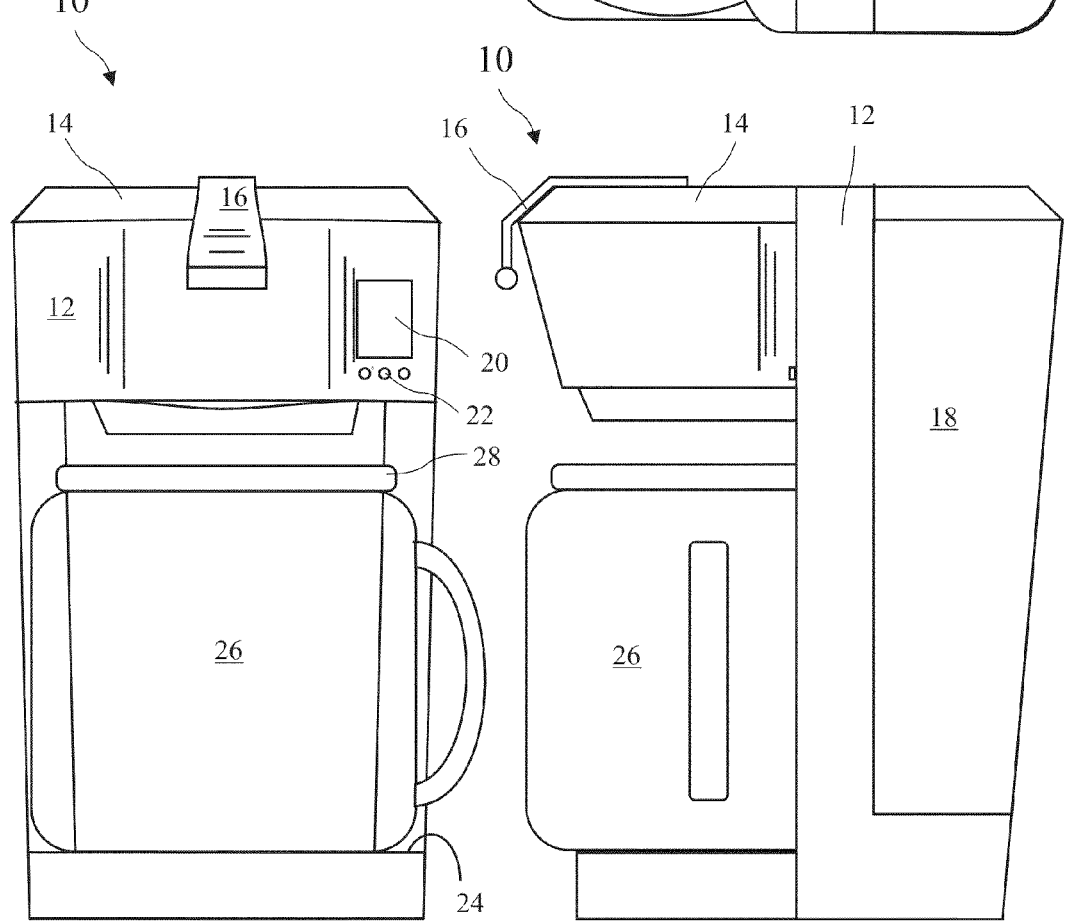
FIG. 1A
FIG. 1B

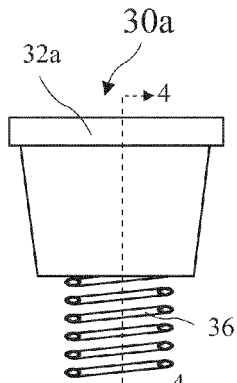 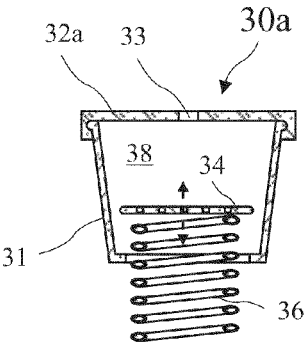 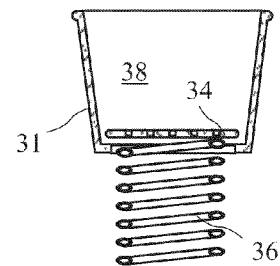
FIG. 3    FIG. 4    FIG. 5A
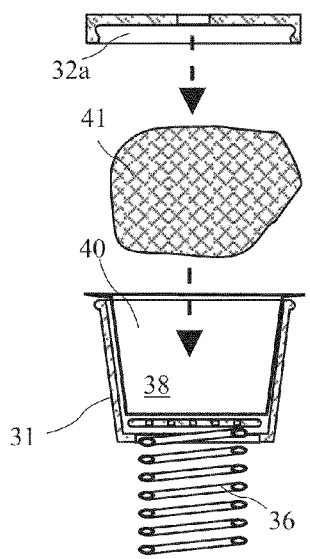 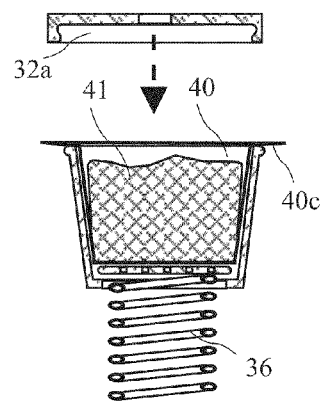 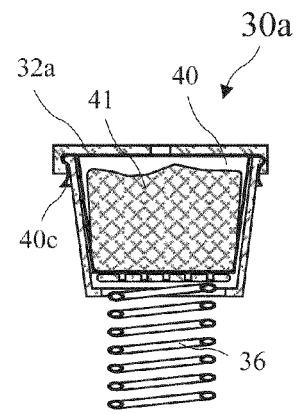
FIG. 5B    FIG. 5C    FIG. 5D
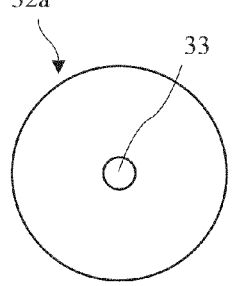 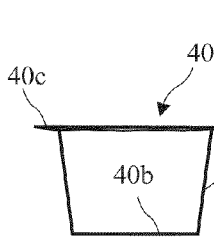 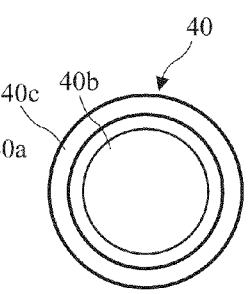 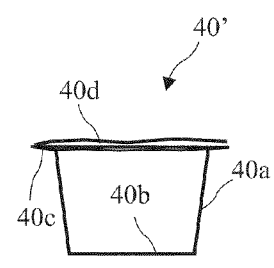
FIG. 6    FIG. 7A    FIG. 7B    FIG. 7C

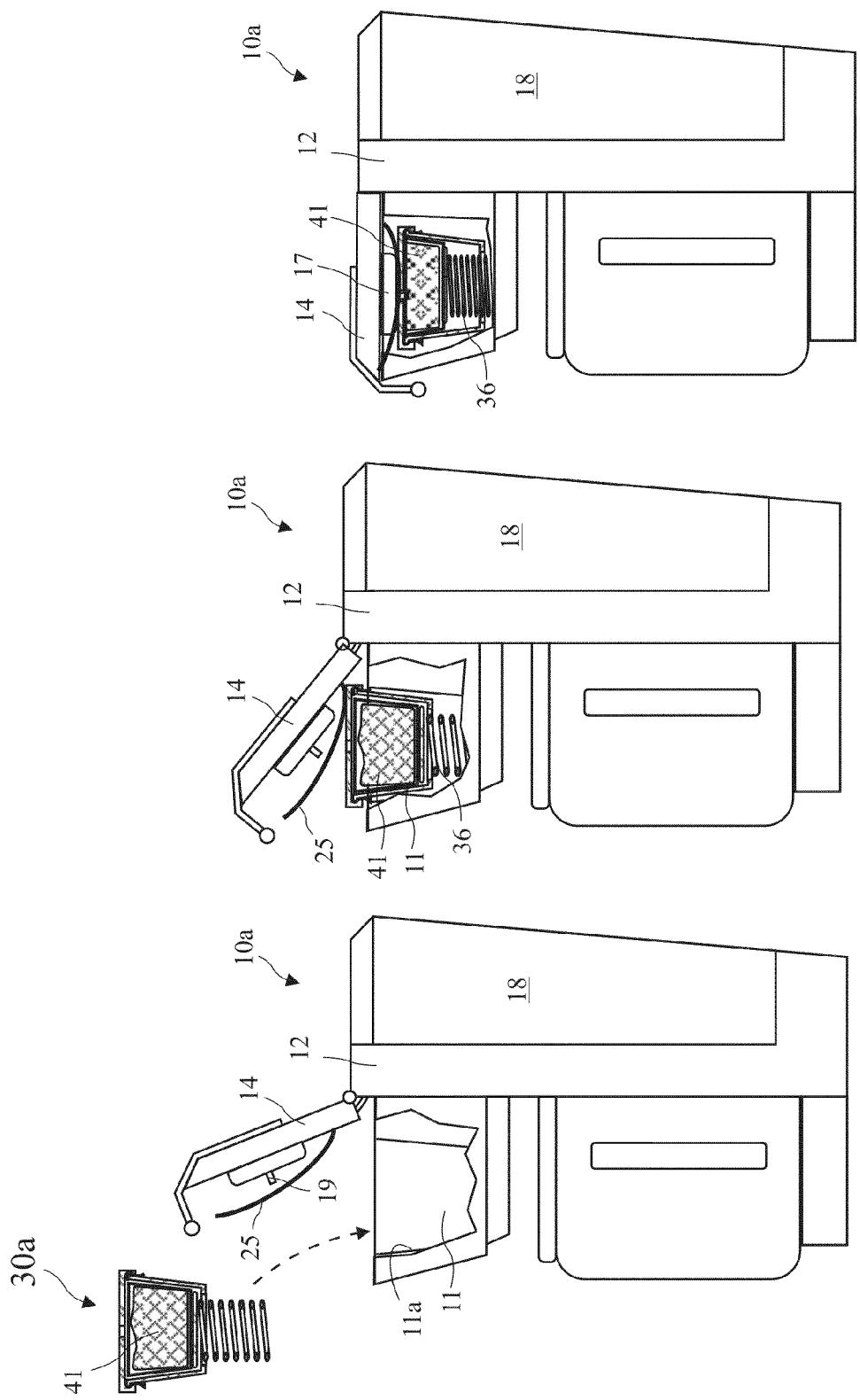

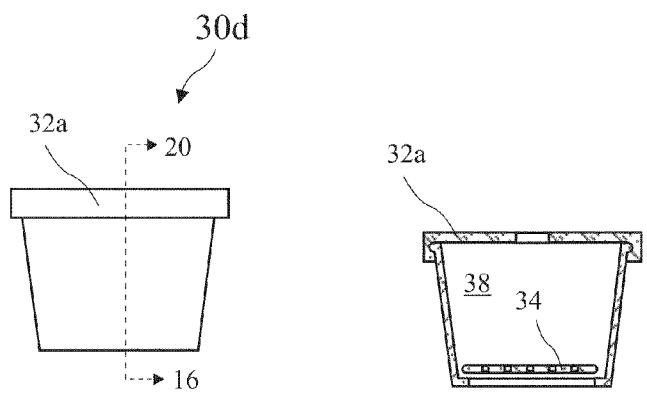
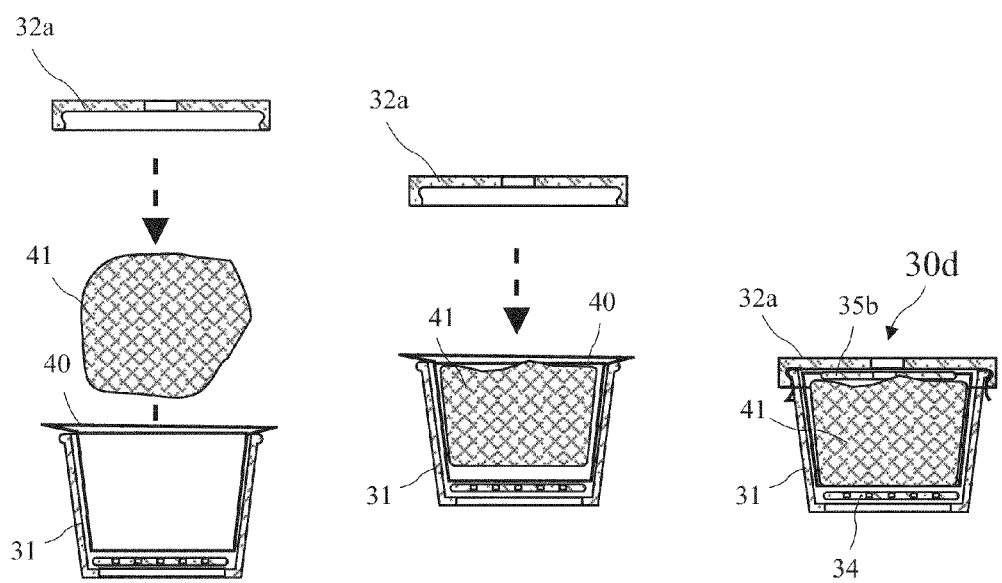
FIG. 19    FIG. 20
FIG. 21A    FIG. 21B    FIG. 21C

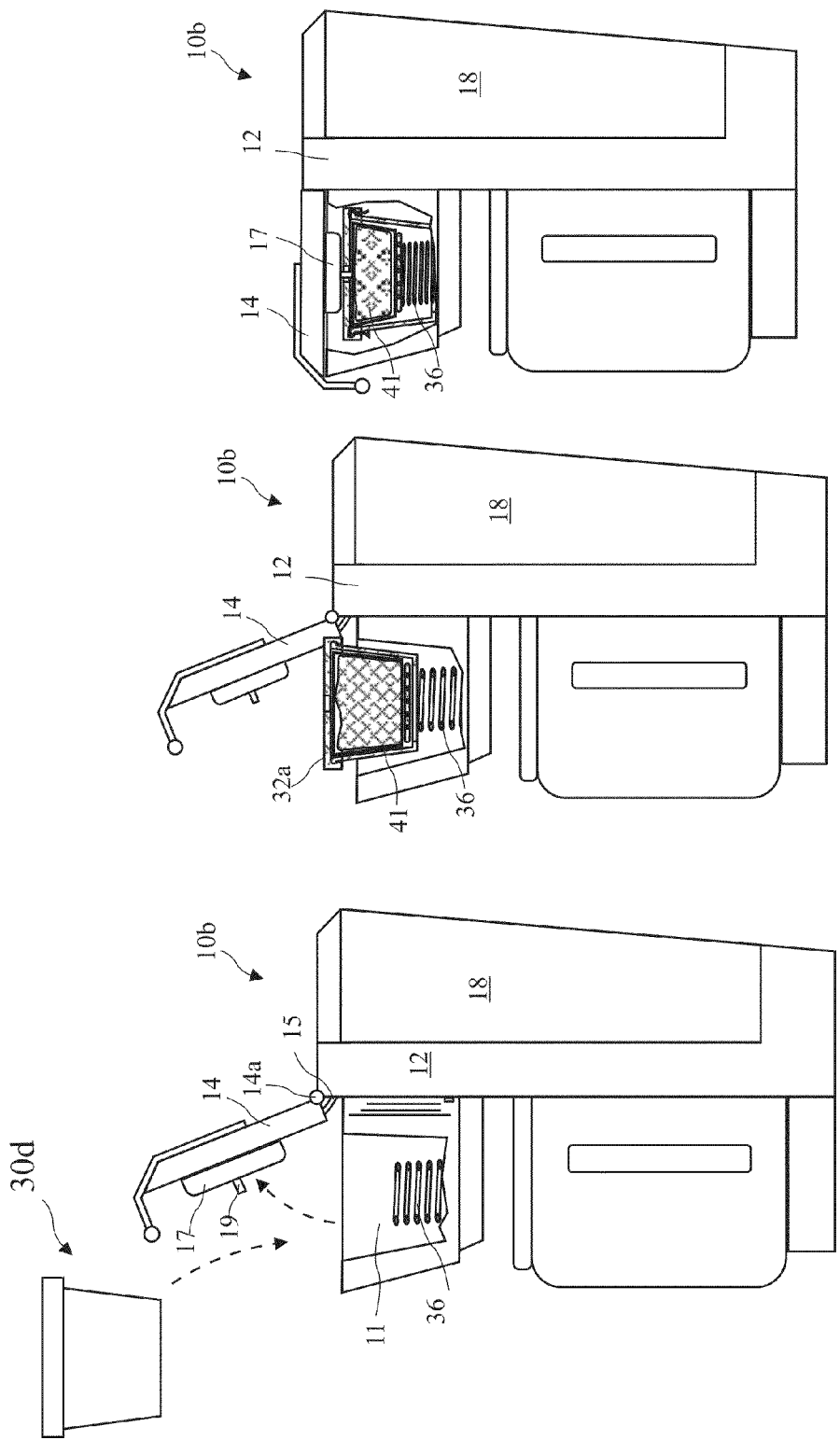

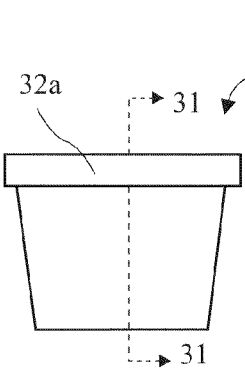
FIG. 30
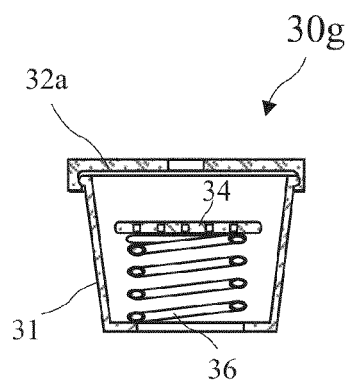
FIG. 31
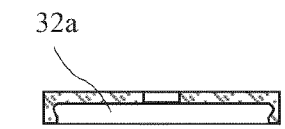
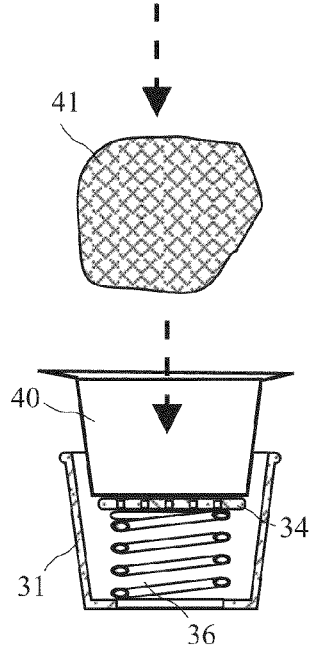
FIG. 32A
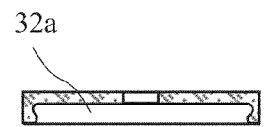
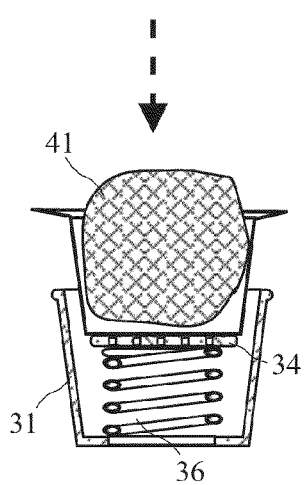
FIG. 32B
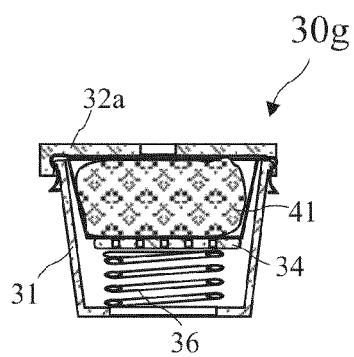
FIG. 32C

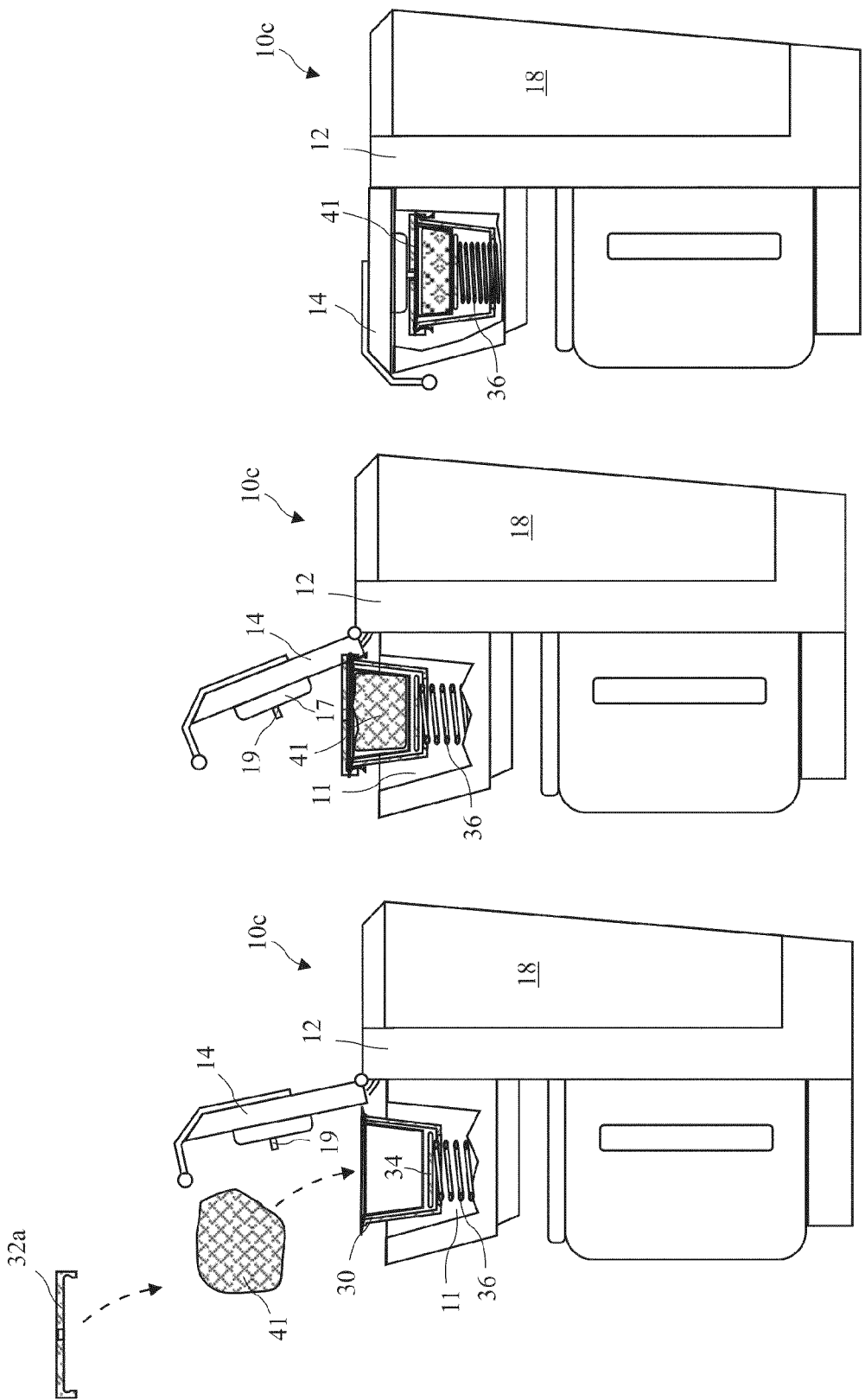

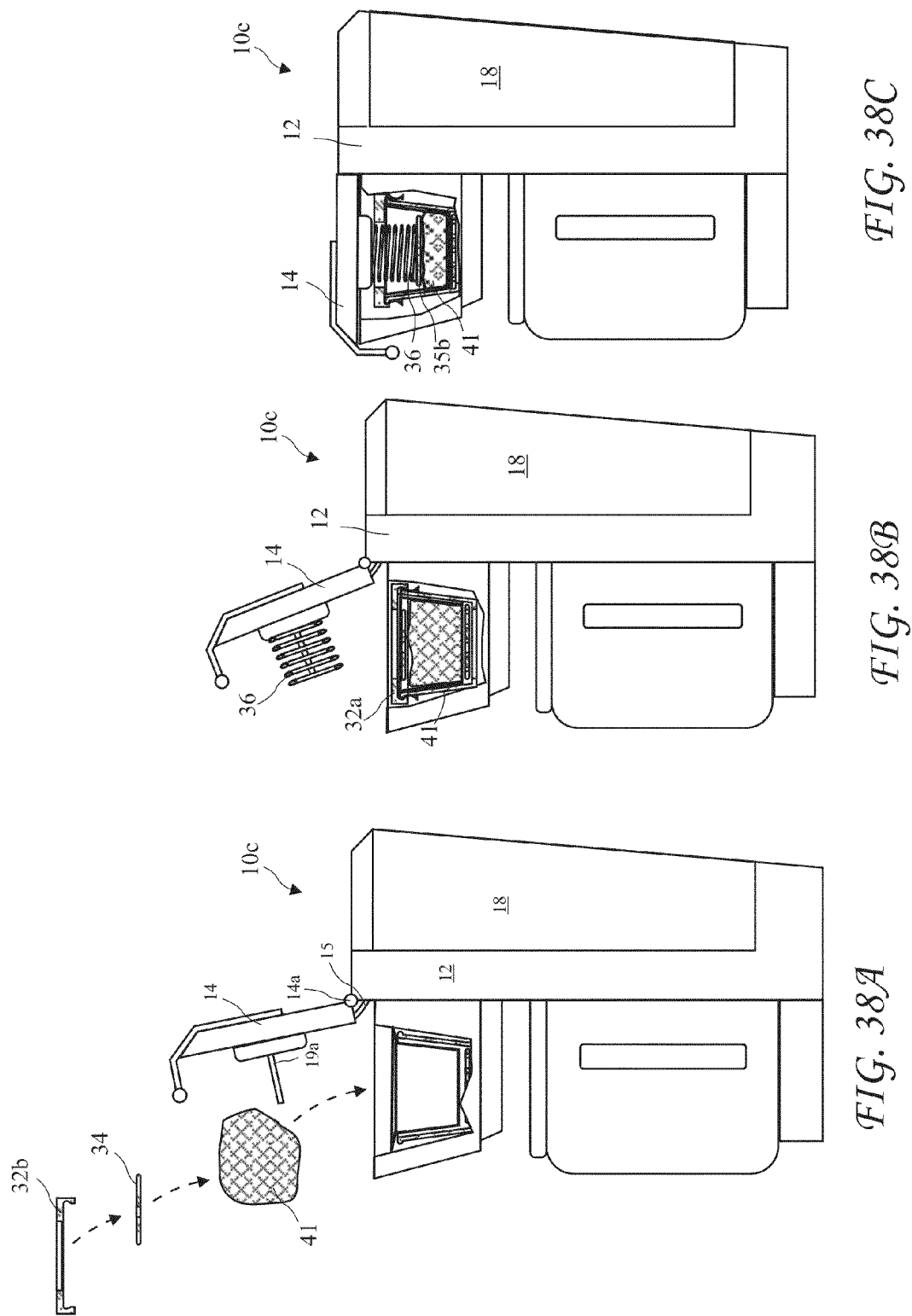

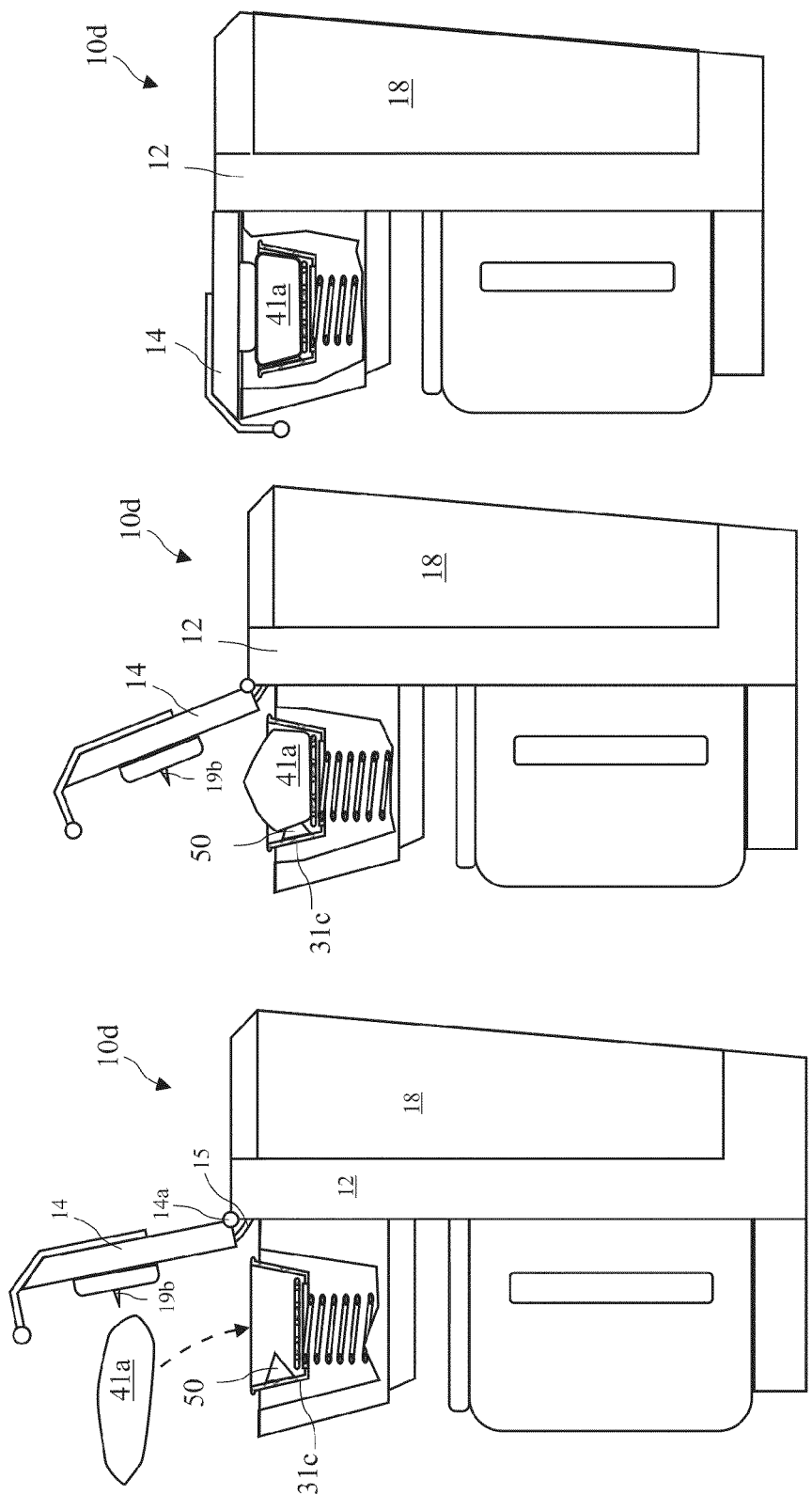

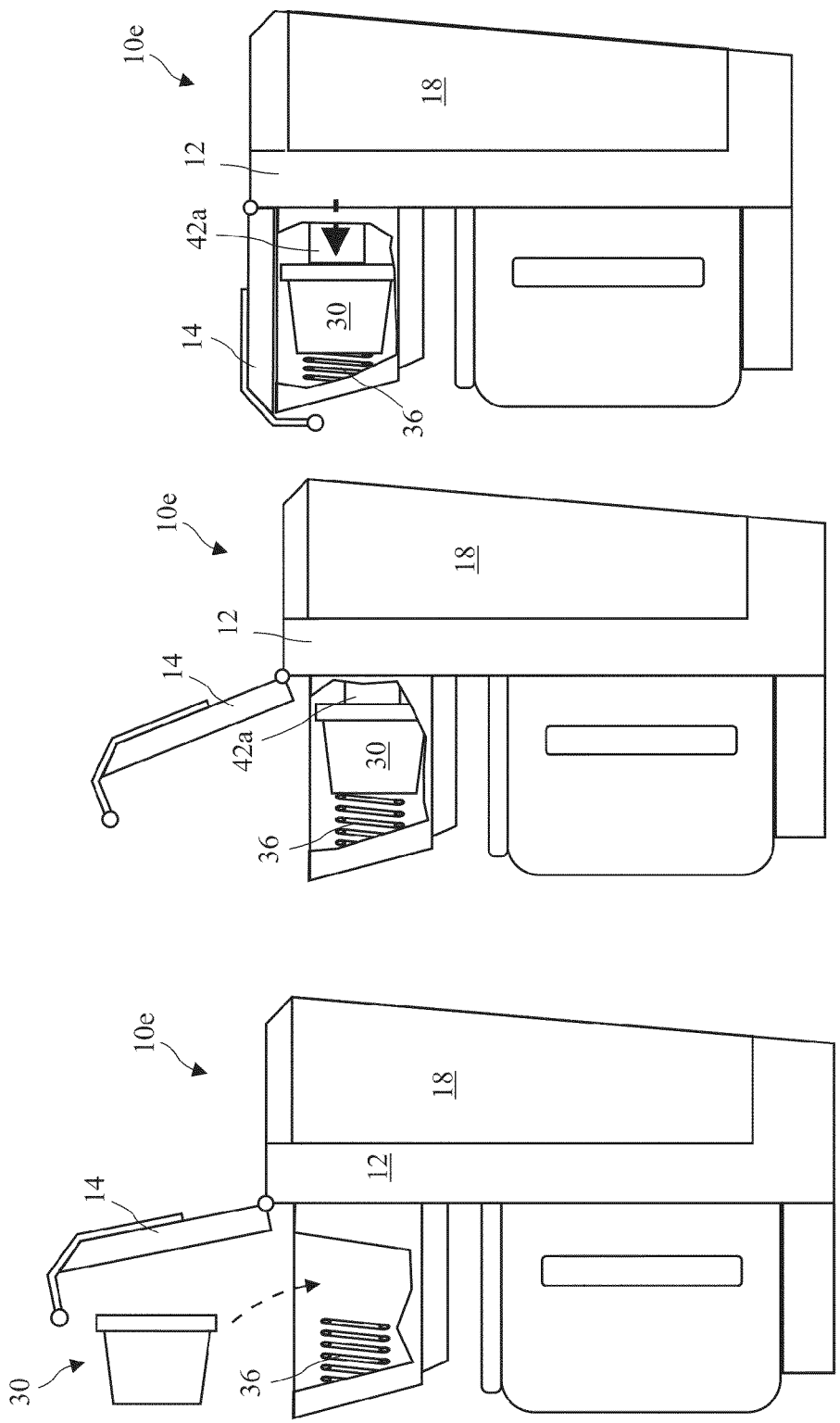

COFFEE MAKER

BACKGROUND OF THE INVENTION

The present invention relates to coffee makers and in particular to a coffee maker utilizing a stream of hot water through tamped ground coffee.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 11/777,831 filed Jul. 13, 2007 for "Pod Adapter System for Single Service Beverage Brewers" by the present applicant overcomes this problem by packaging the coffee in closed filter paper commonly called a pod, and inserting the closed pod into a pod holder including a tamping spring and bottom tamper for tamping the pod between the bottom tamper and a coffee holder lid. While the pod adapter of the '831 application works well for coffee pods, it does not allow the simple use of bulk ground coffee not packaged in the closed pod.

BRIEF SUMMARY OF THE INVENTION

The present invention addresses the above and other needs by providing a coffee making apparatus and methods which provide a tamped packing of loose ground coffee thereby obtaining richer flavor. The Coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

In accordance with one aspect of the invention, there is provided apparatus for tamping coffee. The apparatus includes a coffee maker and a coffee holder. The coffee holder receives a portion of untamped coffee and a holder lid closes the coffee holder after receiving the untamped coffee. A tamper resides inside the coffee holder and limits the portion of the coffee holder interior accessible by the untamped coffee and partially resides outside the coffee holder. The coffee maker includes a coffee maker lid openable to position the coffee holder inside the coffee maker, a coffee holder cavity under the coffee maker lid for receiving the coffee holder. A pad residing on a bottom surface of the coffee maker lid and is configured to reduce the combined vertical space occupied by the coffee holder and tamper to urge the tamper into the coffee holder thereby tamping the coffee. A hot water nozzle is attached to the coffee maker for providing a flow of hot water to the tamped coffee to make a coffee drink.

In accordance with another aspect of the invention, there is provided apparatus for tamping coffee. The apparatus includes a coffee maker and a coffee holder. The coffee holder has a coffee holder interior space for receiving a portion of untamped coffee and a holder lid closing the coffee holder interior space after receiving the untamped coffee. The coffee maker includes a coffee maker lid openable to position the coffee holder inside the coffee maker and a coffee holder cavity under the coffee maker lid for receiving the coffee holder. A tamper residing in the coffee holder cavity is coupled to the coffee holder lid to advance into the coffee holder interior space when the coffee maker lid is closed. A hot water nozzle attached to the coffee maker for providing a flow of hot water to the tamped coffee to make a coffee drink.

In accordance with yet another aspect of the invention, there is provided a coffee making system combining a forced flow of heated water forced though tamped coffee, and apparatus and methods for tamping loose coffee for use in the coffee maker.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3 is a side view of a first coffee holder according to the present invention.

FIG. 4 is a cross-sectional side view of the first coffee holder according to the present invention taken along line 4-4 of FIG. 3.

FIG. 5A is a cross-sectional side view of the first coffee holder according to the present invention taken along line 4-4 of FIG. 3 showing an empty coffee holder with the tamping spring and the bottom tamper according to the present invention.

FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.

FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.

FIG. 5D is a cross-sectional side view of the first coffee holder according to the present invention taken along line 4-4 of FIG. 3 showing the coffee holder with the tamping spring and bottom tamper, the portion of coffee in the coffee holder, and the holder lid attached to the coffee holder body, according to the present invention.

FIG. 6 is a top view of the first holder lid.

FIG. 7A is a side view of a filter paper cup according to the present invention.

FIG. 7B is a top view of the filter paper cup according to the present invention.

FIG. 7C is a second embodiment of the filter paper cup with a lid.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 19 is a side view of a fourth coffee holder according to the present invention.

FIG. 20 is a cross-sectional side view of the fourth coffee holder according to the present invention taken along line 20-20 of FIG. 19.

FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.

FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.

FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

FIG. 22A shows the fourth coffee holder ready for insertion into the coffee maker.

FIG. 22B shows the fourth coffee holder inserted into the coffee maker before tamping the coffee.

FIG. 22C shows the fourth coffee holder inserted into the coffee maker after tamping the coffee.

FIG. 30 is a side view of a seventh coffee holder according to the present invention.

FIG. 31 is a cross-sectional side view of the seventh coffee holder according to the present invention taken along line 31-31 of FIG. 30.

FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.

FIG. 32B is a cross-sectional side view of the seventh coffee holder according to the present invention taken along line 31-31 of FIG. 30 showing the portion of coffee in the coffee holder, and the holder lid ready to attach to the holder body. according to the present invention.

FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

FIG. 37A shows a third coffee maker having a coffee holder for receiving a portion of coffee and tamping spring according to the present invention for tamping the coffee when the coffee maker lid is closed.

FIG. 37B shows the third coffee maker with the coffee holder holding the portion of coffee and the tamping spring under the coffee holder according to the present invention for tamping the coffee when the coffee maker lid is closed.

FIG. 37C shows the third coffee maker with the coffee holder holding the portion of tamped coffee with the coffee maker lid closed for tamping the coffee according to the present invention.

FIG. 38A shows a third coffee maker having a coffee holder for receiving a portion of coffee and tamping spring attached to the coffee maker lid according to the present invention for tamping the coffee when the coffee maker lid is closed.

FIG. 38B shows the third coffee maker with the coffee holder holding the portion of untamped coffee according to the present invention for tamping the coffee when the coffee maker lid is closed.

FIG. 38C shows the third coffee maker with the coffee holder holding the portion of tamped coffee with the coffee maker lid closed to push the tamping spring into the coffee holder for tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 40A shows a fifth coffee maker accepting a horizontal coffee holder and tamping spring residing horizontally in a coffee holder cavity according to the present invention for tamping the coffee when the coffee maker lid is closed.

FIG. 40B shows the fifth coffee maker with the coffee holder residing horizontally in the coffee holder cavity according to the present invention for tamping the coffee when the coffee maker lid is closed.

FIG. 40C shows the fifth coffee maker with the coffee holder residing horizontally in the coffee holder cavity with the coffee maker lid closed and the coffee holder pushed against the tamping spring for tamping the coffee, according to the present invention.

Corresponding reference characters indicate corresponding components throughout the several views of the drawings.

DETAILED DESCRIPTION OF THE INVENTION

Figure 2A:
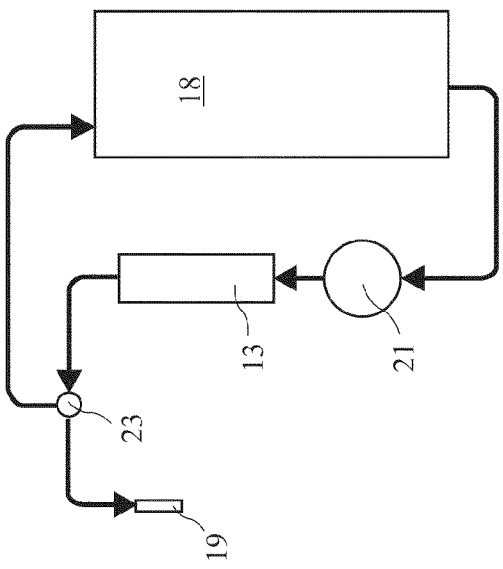
FIG. 2A is a functional diagram of the coffee maker.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, and platform 24. A coffee pitcher 26 rests on the platform 24 and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

Figure 2:
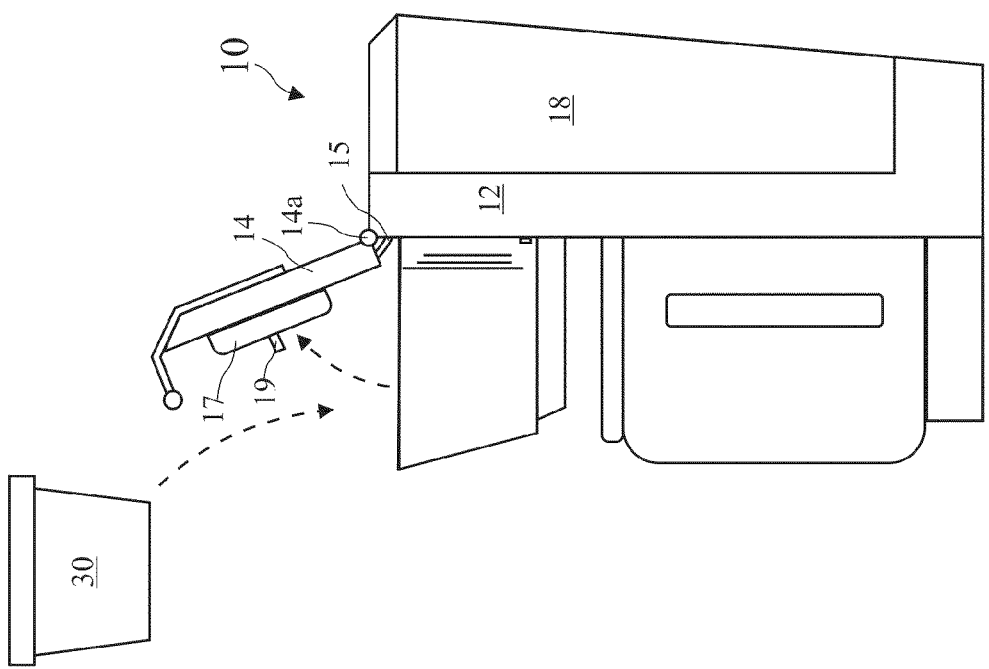
FIG. 2 is a side view of the coffee maker with an open lid allowing placement of a coffee holder according to the present invention inside the coffee maker.

A side view of the coffee maker 10 with an open lid 14 allowing placement of a coffee holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring the water in the water tank 18, and a coffee maker using any means to provide a forced flow of water is intending to within the scope of the present invention.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 35 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

A cross-sectional side view of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30a with the tamping spring 36 and bottom tamper 34, a portion of loose coffee 41, and the holder lid 32a ready to attach is shown in FIG. 5B. A cross-sectional side view of the first coffee holder 30a taken along line 4-4 of FIG. 3 showing the coffee holder 30a with the tamping spring 36 and bottom tamper 34, a portion of coffee in the volume 38, and the holder lid 32a ready to attach is shown in FIG. 5C. A cross-sectional side view of the first coffee holder 30a taken along line 4-4 of FIG. 3 showing the coffee holder 30a with the tamping spring 36 and bottom tamper 34, a portion of loose coffee 41 in the volume 38, and the holder lid 32a attached to the coffee holder 30a, is shown in FIG. 5D.

A top view of the first holder lid 32a showing the passage 33 provided for the nozzle 19 (see FIG. 2) is shown in FIG. 6.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The rim 40c rests on a top edge of the holder body 31 and is held between the holder cap and body when the cap is placed on the body, thereby preventing or restricting the escape of coffee 41 from the cup 40 when hot water flows into the coffee holder 30a.

A second embodiment of the filter paper cup 40' with a lid 40d is shown in FIG. 7C. The lid 40d of the filter paper cup 40' may be folded over the cup 40' after loose coffee is poured into the cup.

The filter cups may be made from several materials including filter paper, nylon mesh, steel mesh, or any material suitable for filtration.

The first coffee holder 30a is shown ready for insertion into a first coffee maker 10a in FIG. 8A, the first coffee holder 30a is shown inserted into the coffee maker 10 before tamping the coffee 41 in FIG. 8B, and the first coffee holder 30a is shown in the coffee maker 10 after tamping the coffee 41 in FIG. 8C. The coffee maker includes a cavity 11 for accepting the coffee holder and has walls 11a for aligning the coffee holder in the coffee maker. When the lid 14 is closed, the pad 17 on the bottom of the lid 14 and/or arms 25 attached to the bottom of the lid 25, push the coffee holder 30a down over the tamping spring 36 and the coffee 41 is tamped between the lid 32a and the bottom tamper 34. The arms 25 push the coffee holder 30a down ahead of the nozzle 19 thereby seating the coffee holder 30a in the cavity 11 for alignment of the nozzle 10 with the passage 33 in the lid 32a.

Figure 9:
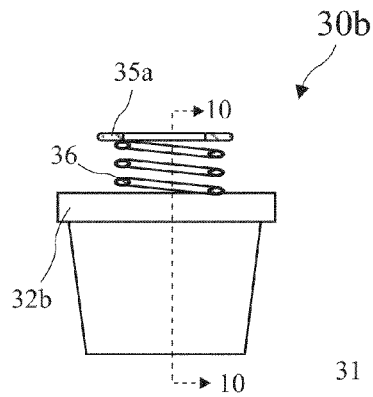
FIG. 9 is a side view of a second coffee holder according to the present invention.
Figure 10:
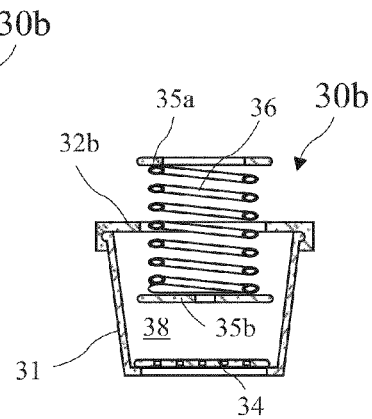
FIG. 10 is a cross-sectional side view of the second coffee holder according to the present invention taken along line 10-10 of FIG. 9.

A side view of a second coffee holder 30b according to the present invention is shown in FIG. 9 and a cross-sectional side view of the second coffee holder 30b taken along line 10-10 of FIG. 9 is shown in FIG. 10. The coffee holder 30b includes the holder body 31, a second holder lid 32b, a tamper spring 36, a spring washer 35a, and a top tamper 35b.

Figure 11A:
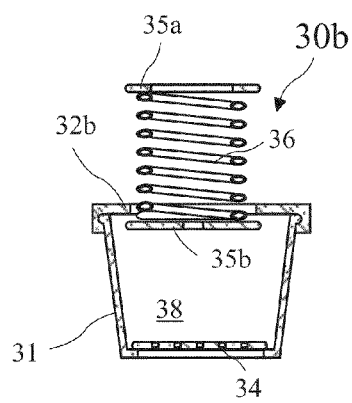
FIG. 11A is a cross-sectional side view of the second coffee holder according to the present invention taken along line 10-10 of FIG. 9 showing an empty coffee holder with the tamping spring and the top tamper according to the present invention.
Figure 11B:
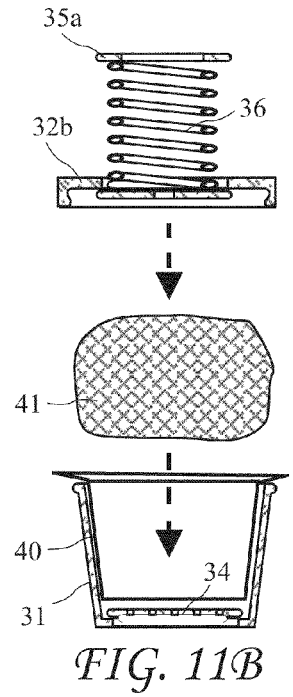
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
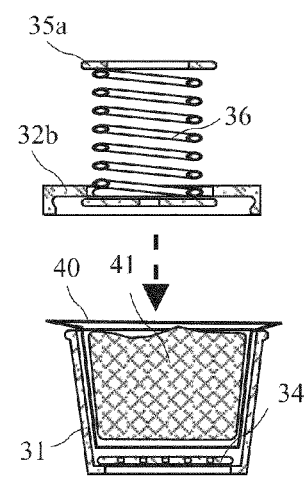
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
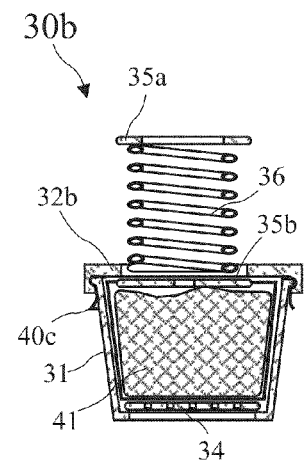
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30b taken along line 10-10 of FIG. 9 showing an empty coffee holder 30b is shown in FIG. 11A. A cross-sectional side view of the second coffee holder 30b taken along line 10-10 of FIG. 9 showing the holder lid 32b and a loose portion of coffee 41 above the empty coffee holder 30b is shown in FIG. 11B. A cross-sectional side view of the second coffee holder 30b taken along line 10-10 of FIG. 9 showing the holder lid 32b above the coffee holder 30b with the portion of loose coffee 41 in the coffee holder 32b is shown in FIG. 11C. A cross-sectional side view of the second coffee holder 32b taken along line 10-10 of FIG. 9 showing the coffee holder with the holder lid 32b attached to the coffee holder 30b and a portion of loose coffee 41 in the coffee holder 30b is shown in FIG. 11D. The tamping spring 36 extends upward out of the coffee holder 30b for tamping the loose coffee as disclosed hereafter.

Figure 12:
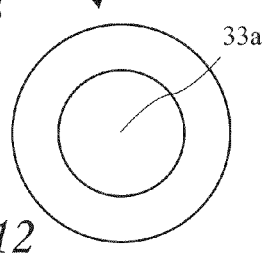
FIG. 12 is a top view of the second holder lid.

A top view of the second holder lid 32b is shown in FIG. 12. The holder lid 32b includes a larger passage 33a allowing passage of the tamping spring 36 through the holder lid 32b.

Figure 13:
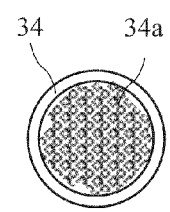
FIG. 13 is a top view of the bottom tamper.

A top view of the bottom tamper 34 is shown in FIG. 13. The bottom tamper 34 includes perforations 34a to allow coffee drink to pass through the bottom tamper 34.

Figure 14C:
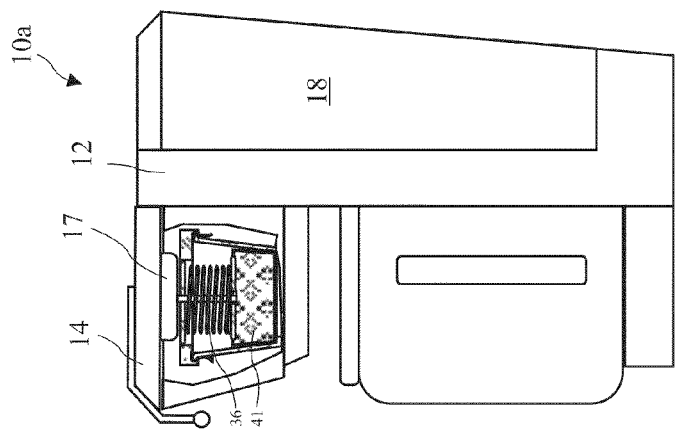
FIG. 14C shows the second coffee holder inserted into the coffee maker after tamping the coffee.
Figure 14B:
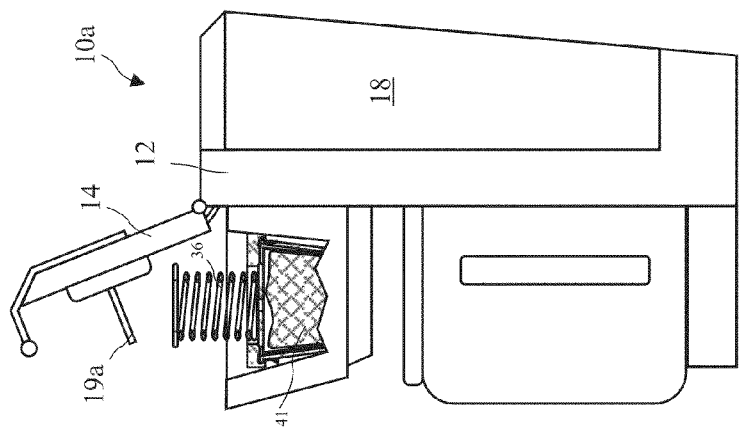
FIG. 14B shows the second coffee holder inserted into the coffee maker before tamping the coffee.
Figure 14A:
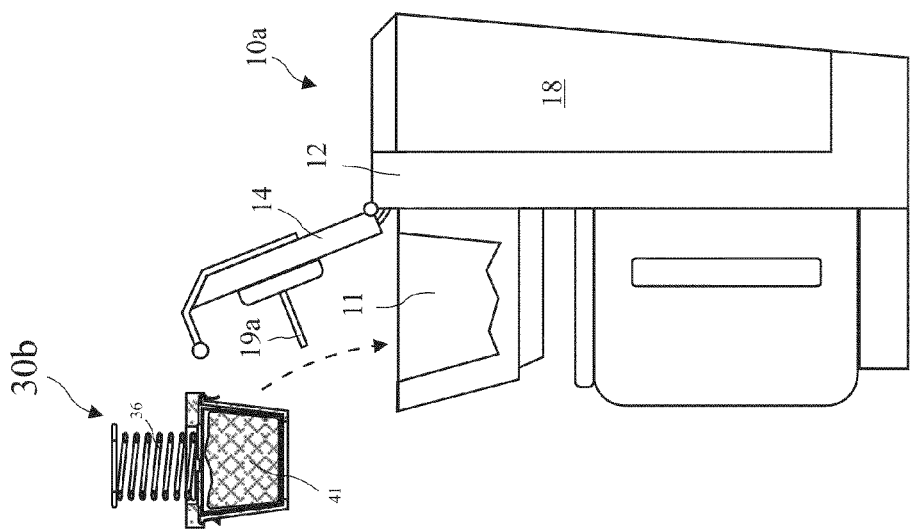
FIG. 14A shows the second coffee holder ready for insertion into the coffee maker.

The second coffee holder 30b is shown ready for insertion into the coffee maker 10 in FIG. 14A, the second coffee holder 30b is shown inserted into the coffee maker 10 before tamping the coffee 41 in FIG. 14B, and the second coffee holder 30b is shown in the coffee maker 10 after tamping the coffee 41 in FIG. 14C. The coffee maker 10 may include a long nozzle 19a to reach the top tamper 35b for "injection" of the heated water into the tamped coffee, but may also include the nozzle 19 and the heated water may pass through the coffee 41 under the pull of gravity.

Figure 15:
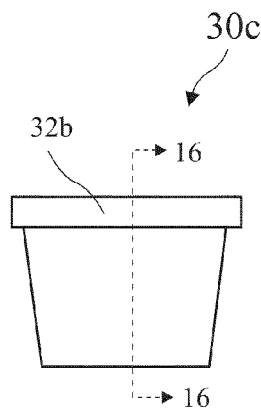
FIG. 15 is a side view of a third coffee holder according to the present invention.
Figure 16:
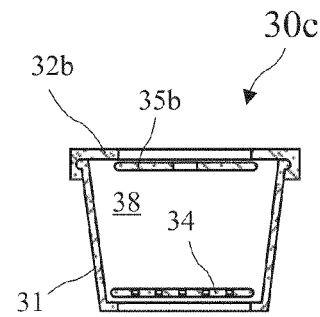
FIG. 16 is a cross-sectional side view of the third coffee holder according to the present invention taken along line 16-16 of FIG. 15.

A side view of a third coffee holder 30c according to the present invention is shown in FIG. 16 and a cross-sectional side view of the third coffee holder 30c taken along line 16-16 of FIG. 15 is shown in FIG. 16. The coffee holder 30c includes the holder body 31, the second holder lid 32b, the bottom tamper 34, and the top tamper 35b.

Figure 17A:
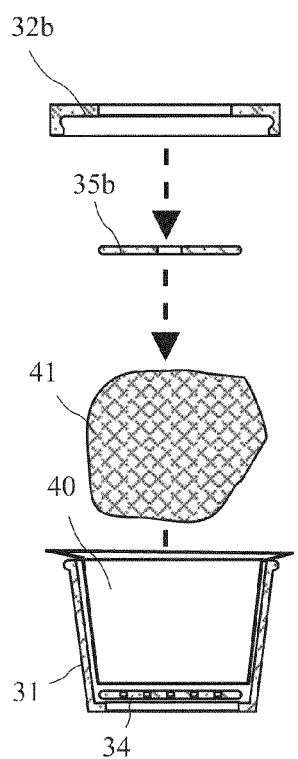
FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.
Figure 17B:
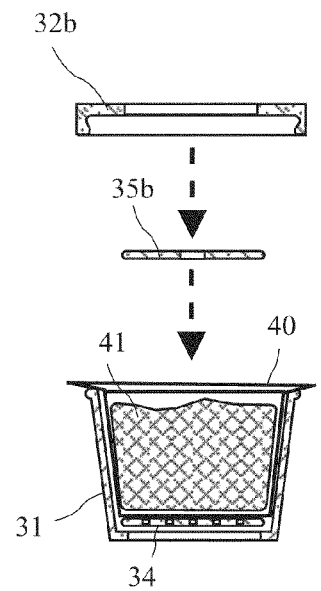
FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.
Figure 17C:
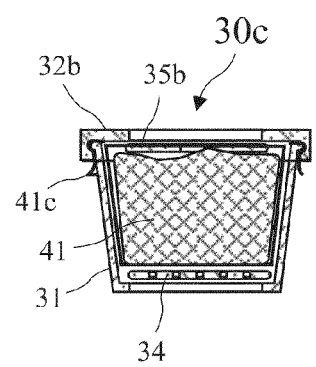
FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

A cross-sectional side view of the third coffee holder 30c taken along line 16-16 of FIG. 15 showing the coffee holder 30c with the holder lid 32b, the top tamper 35b, and a portion of coffee, ready to attach to the holder 31, is shown in FIG. 17A. A cross-sectional side view of the third coffee holder taken along line 16-16 of FIG. 15 showing the coffee holder 30c with the holder lid 32b and the top tamper ready to attach, and a portion of coffee 41 in the coffee holder, is shown in FIG. 17B. A cross-sectional side view of the third coffee holder 30c taken along line 16-16 of FIG. 15 showing the coffee holder with the holder lid and the top tamper attached and a loose portion of coffee 41 in the coffee holder is shown in FIG. 17C. The coffee holder 30c is configured to use with a coffee make 10b (see FIGS. 18A-18C) including apparatus for entering the coffee holder for tamping the loose coffee 41.

Figure 18C:
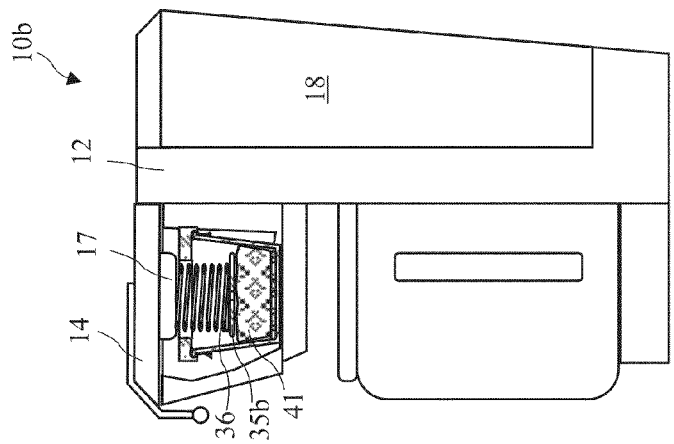
FIG. 18C shows the third coffee holder inserted into the coffee maker after tamping the coffee.
Figure 18B:
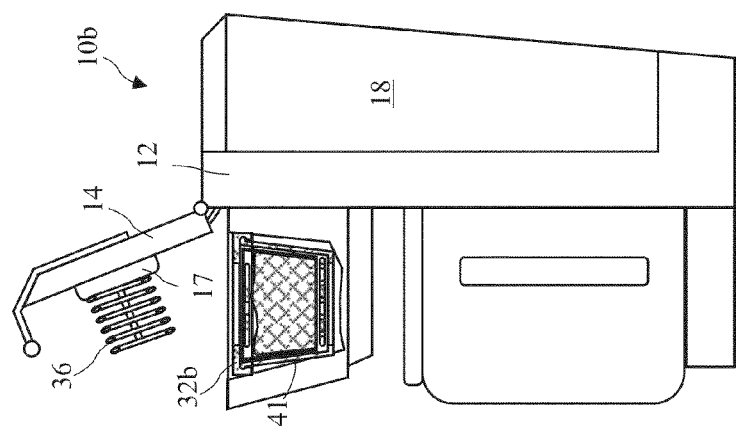
FIG. 18B shows the third coffee holder inserted into the coffee maker before tamping the coffee.
Figure 18A:
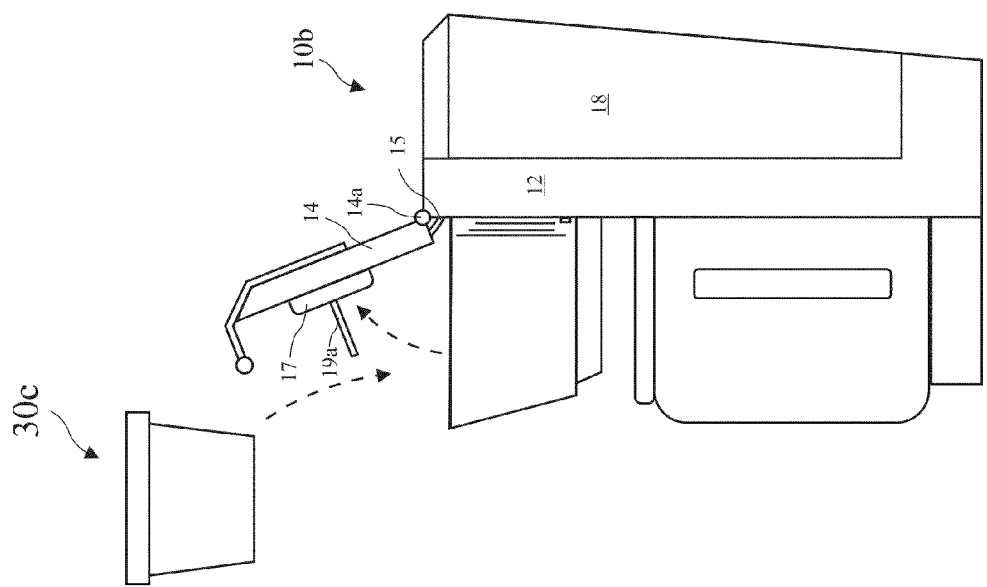
FIG. 18A shows the third coffee holder ready for insertion into a second coffee maker according to the present invention.

The third coffee holder 30c ready for insertion into a second coffee maker 10b in FIG. 18A, the third coffee holder 30c is shown residing in the coffee maker 10b before tamping the coffee 41 in FIG. 18B, and the third coffee holder 30c is shown residing in the coffee maker 10b after tamping the coffee 41 in FIG. 18C. The coffee maker 10b includes the tamping spring 36 attached to the pad 17 on the bottom of the lid 14. When the lid 14 is closed the tamping spring 36 enters the coffee holder 30c through the lid passage 33a (see FIG. 12) and pushes the top tamper 35b against the coffee 41 to tamp the coffee 41.

A side view of a fourth coffee holder 30d according to the present invention is shown in FIG. 19 and a cross-sectional side view of the fourth coffee holder 30d taken along line 20-20 of FIG. 19 is shown in FIG. 20. The coffee holder 30d includes the holder body 31, the first holder lid 32a, and the bottom tamper 34.

A cross-sectional side view of the fourth coffee holder 30d taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30d taken along line 20-20 of FIG. 19 showing the coffee holder 30d with the bottom tamper 34, the portion of coffee 41 in the coffee holder 30d, and the holder lid 32a ready to attach is shown in FIG. 21B. A cross-sectional side view of the fourth coffee holder 30d taken along line 20-20 of FIG. 19 showing the coffee holder 30d with the bottom tamper 34, a portion of coffee in the coffee holder 41, and the holder lid 32a is shown in FIG. 21C.

The fourth coffee holder 30d ready for insertion into another embodiment of the second coffee maker 10b in FIG. 22A, the fourth coffee holder 30d is shown residing in the coffee maker 10b before tamping the coffee 41 in FIG. 22B, and the fourth coffee holder 30d is shown residing in the coffee maker 10b after tamping the coffee 41 in FIG. 22C. The coffee maker 10b may include the tamping spring 36 residing in the bottom of the coffee holder cavity 11. When the lid 14 is closed, the pad 17 pushed the coffee holder 30d down over the tamping spring 36 and the tamping spring 36 enters the coffee holder 30c through the bottom of the holder body 31 and pushes the bottom tamper 34 against the coffee 41 to tamp the coffee 41.

Figure 23C:
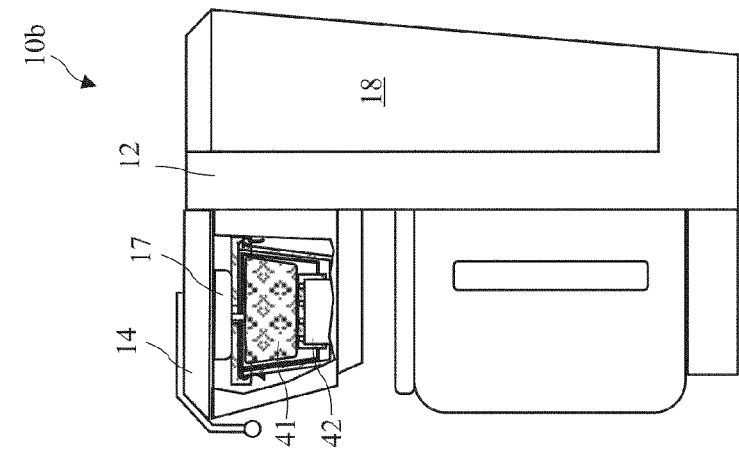
FIG. 23C shows the fourth coffee holder inserted into the coffee maker having the tamping block after tamping the coffee.
Figure 23B:
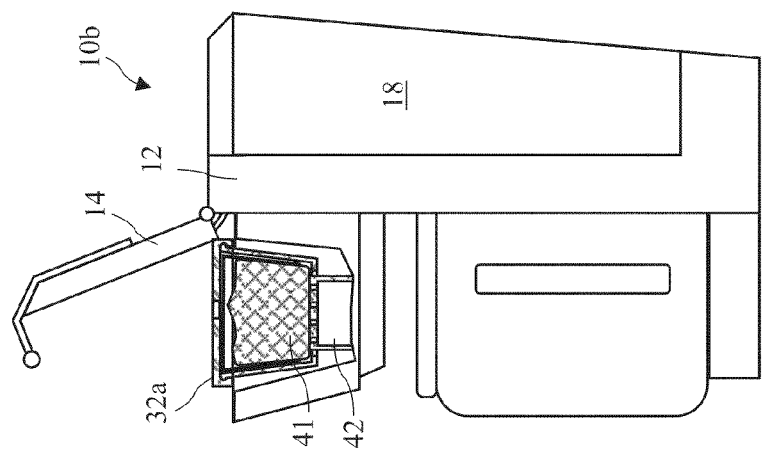
FIG. 23B shows the fourth coffee holder inserted into the coffee maker having the tamping block before tamping the coffee.
Figure 23A:
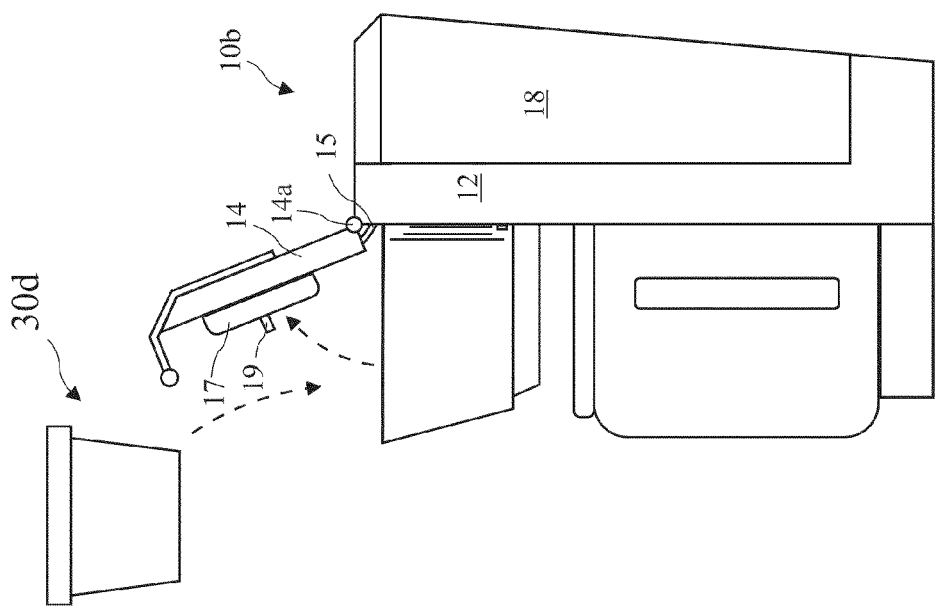
FIG. 23A shows the fourth coffee holder ready for insertion into the coffee maker having a tamping block according to the present invention.

The fourth coffee holder 30d ready for insertion into another embodiment of the second coffee maker 10b in FIG. 23A, the fourth coffee holder 30d is shown residing in the coffee maker 10b before tamping the coffee 41 in FIG. 23B, and the fourth coffee holder 30d is shown residing in the coffee maker 10b after tamping the coffee 41 in FIG. 23C. The coffee maker 10b may include a resilient solid block 42 residing in the bottom of the coffee holder cavity 11. When the lid 14 is closed, the pad 17 pushed the coffee holder 30d down over the resilient solid block 42 and the resilient solid block 42 enters the coffee holder 30c through the bottom of the holder body 31 and pushes the bottom tamper 34 against the coffee 41 to tamp the coffee 41.

Figure 24:
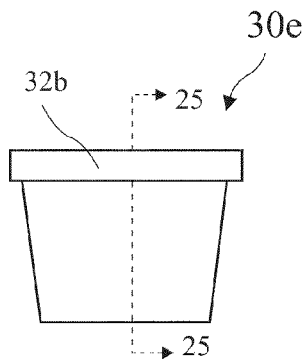
FIG. 24 is a side view of a fifth coffee holder according to the present invention.
Figure 25:
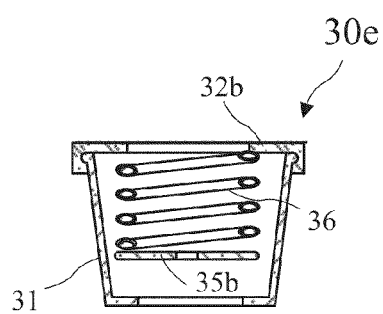
FIG. 25 is a cross-sectional side view of the fifth coffee holder according to the present invention taken along line 25-25 of FIG. 24.

A side view of a fifth coffee holder 30e according to the present invention is shown in FIG. 24 and a cross-sectional side view of the fifth coffee holder 30e taken along line 25-25 of FIG. 24 is shown in FIG. 25. The fifth coffee holder 30e includes the holder body 31, the holder lid 32b, the tamping spring 36 and the top tamper 35b attached to the holder lid 32a.

Figure 26A:
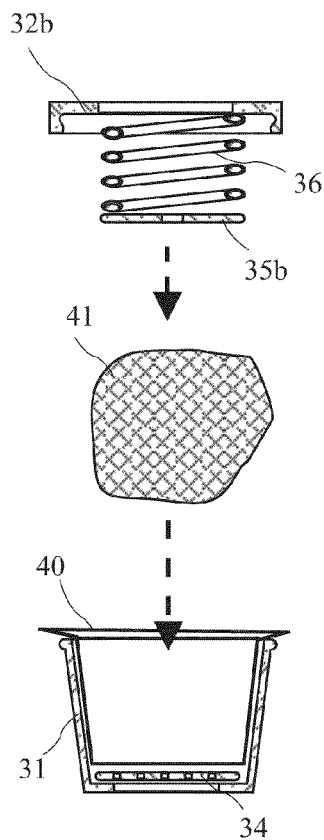
FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.
Figure 26B:
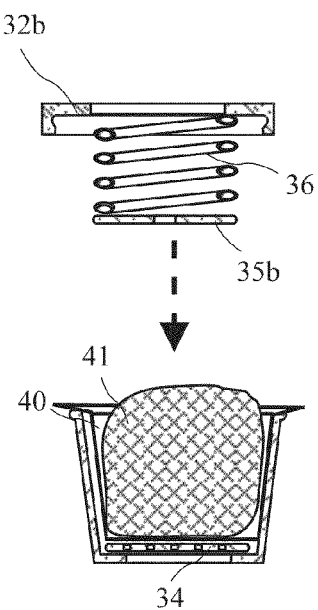
FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.
Figure 26C:
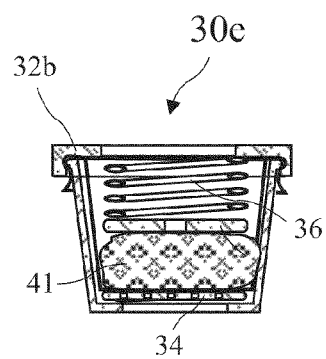
FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

A cross-sectional side view of the fifth coffee holder 30e taken along line 25-25 of FIG. 24 showing the coffee holder 30e with a portion of coffee 41, and the holder lid 32b with the top tamper 35b and tamping spring 36 attached, above the holder body 31, is shown in FIG. 26A. A cross-sectional side view of the fifth coffee holder 30e taken along line 25-25 of FIG. 24 showing the coffee holder with the portion of coffee 41 in the coffee holder, and the holder lid 32b with the top tamper 35b and tamping spring 36 attached, above the holder body 31, is shown in FIG. 26B. A cross-sectional side view of the fifth coffee holder 30e taken along line 25-25 of FIG. 24 showing the coffee holder 30e with the portion of coffee 41 in the coffee holder 30e, and the holder lid 32b with the top tamper 35b and tamping spring 36 attached to the holder base 31 is shown in FIG. 26D. The tamper spring 36 and top tamper 35b tamp the coffee 41 to provide a tamped coffee when the holder lid 32b is attached to the holder base 31.

Figure 27:
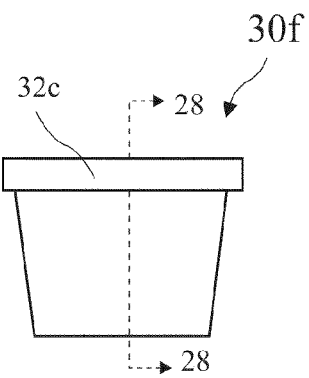
FIG. 27 is a side view of a sixth coffee holder according to the present invention.
Figure 28:
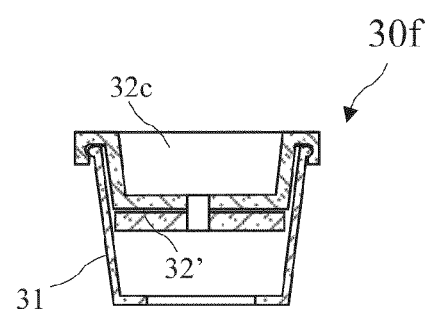
FIG. 28 is a cross-sectional side view of the sixth coffee holder according to the present invention taken along line 28-28 of FIG. 27.

A side view of a sixth coffee holder 30f according to the present invention is shown in FIG. 27 and a cross-sectional side view of the sixth coffee holder 30f taken along line 28-28 of FIG. 27 is shown in FIG. 28. The sixth coffee holder 30f includes the holder body 31 and a third holder lid 32c. The third holder lid 32c includes a recessed portion 32' which reaches into the interior of the sixth coffee holder 30f. The recessed portion 32' is preferably a solid resilient material.

Figure 29A:
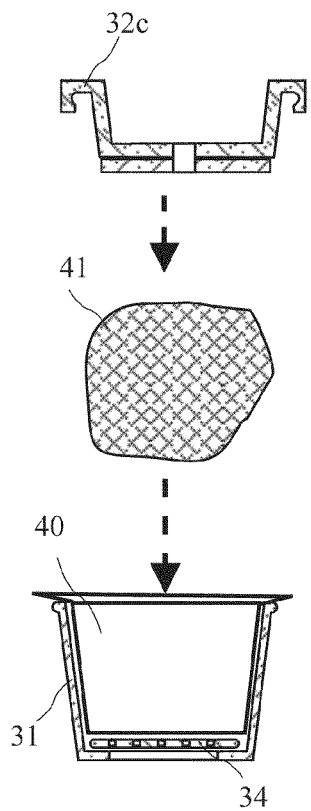
FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.
Figure 29B:
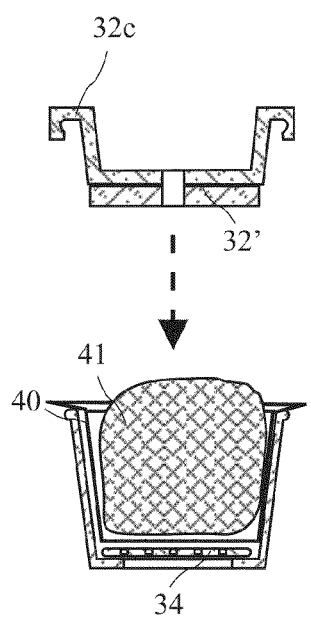
FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.
Figure 29C:
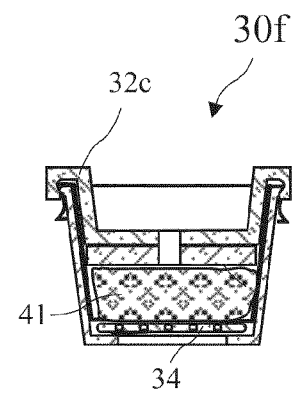
FIG. 29C is a cross-sectional side view of the sixth coffee holder according to the present invention taken along line 28-28 of FIG. 27 showing the portion of coffee in the coffee holder, and the holder lid attached and tamping the coffee, according to the present invention.

A cross-sectional side view of the sixth coffee holder 30f taken along line 28-28 of FIG. 27 showing the sixth coffee holder 30f with a portion of coffee 41, and the holder lid 32c, above the holder body 31, is shown in FIG. 29A. A cross-sectional side view of the sixth coffee holder 30f taken along line 28-28 of FIG. 27 showing the coffee holder with the portion of coffee 41 in the coffee holder, and the holder lid 32c above the holder body 31, is shown in FIG. 29B. A cross-sectional side view of the sixth coffee holder 30f along line 28-28 of FIG. 27 showing the sixth coffee holder 30f with the portion of coffee 41 in the coffee holder 30e, and the holder lid 32e attached to the holder base 31 is shown in FIG. 26D. A cushion 32' tamps the coffee 41 to provide a tamped coffee when the holder lid 32e is attached to the holder base 31. The cushion 32' is preferably made from a resilient material to cushion the tamping of the loose coffee.

A side view of a seventh coffee holder 30g according to the present invention is shown in FIG. 30 and a cross-sectional side view of the seventh coffee holder 30g taken along line 31-31 of FIG. 30 is shown in FIG. 31. The seventh coffee holder 30g includes the holder body 31, the holder lid 32b, the tamping spring 36, and the bottom tamper 34 inside the holder base 31.

A cross-sectional side view of the seventh coffee holder 30g taken along line 31-31 of FIG. 30 showing the seventh coffee holder 30g with a portion of coffee 41 and the holder lid 32a above the holder body 31, and with the bottom tamper 34 and tamping spring 36 inside the holder base 31, is shown in FIG. 26A. A cross-sectional side view of the seventh coffee holder 30g taken along line 31-31 of FIG. 30 showing the coffee holder with the portion of coffee 41 in the filter paper 40 in the holder base 31 resting on the bottom tamper 34 supported by the tamper spring 36, and the holder lid 32a above the holder body 31, is shown in FIG. 26B. A cross-sectional side view of the seventh coffee holder 30g taken along line 31-31 of FIG. 30 showing the seventh coffee holder 30g with the portion of coffee 41 in the coffee holder 30e, and the holder lid 32a attached to the holder base 31, is shown in FIG. 26D. The tamper spring 36 and bottom tamper 34 tamp the coffee 41 upward against the tamper lid 32a to provide a tamped coffee when the holder lid 32a is attached to the holder base 31.

Figures 33, 34A, 34B:
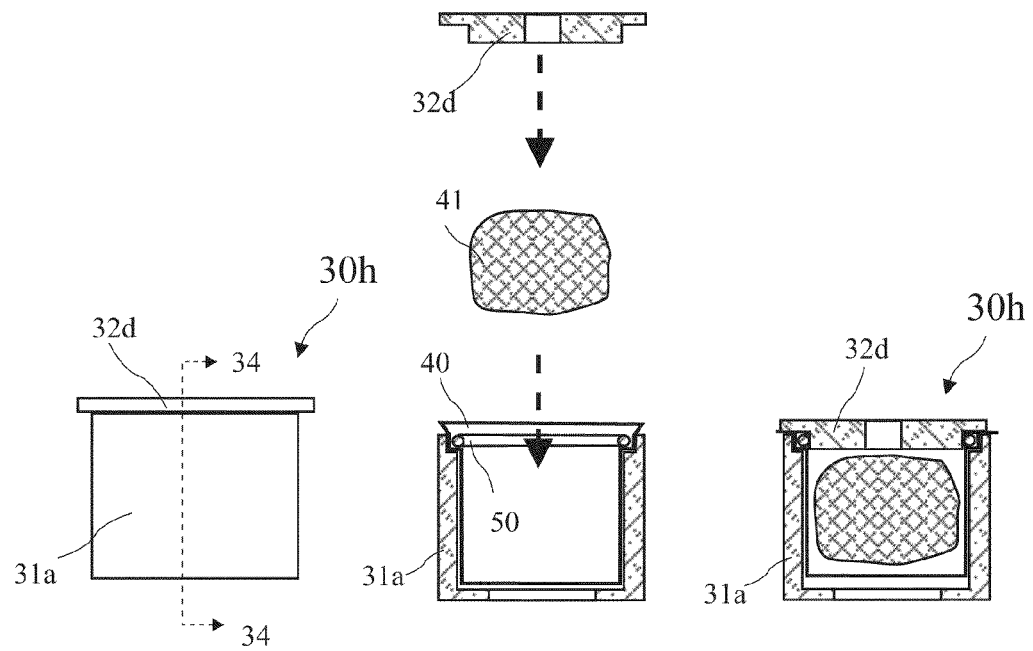
FIG. 33 is a side view of an eighth coffee holder according to the present invention.
FIG. 34A is a cross-sectional side view of the eighth coffee holder taken along line 34-34 of FIG. 33 showing a portion of coffee for placing inside the coffee holder and the holder lid with an insertable portion and an O-Ring inside the coffee holder for sealing according to the present invention.
FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

A side view of an eighth coffee holder 30h according to the present invention is shown in FIG. 33, a cross-sectional side view of the eighth coffee holder 30h taken along line 34-34 of FIG. 33 showing a portion of coffee 41 for placing inside the coffee holder and a fourth holder lid 32d with an insertable portion and an O-Ring 50 inside the coffee holder for sealing is shown in FIG. 34A, and a cross-sectional side view of the eighth coffee holder taken along line 34-34 of FIG. 33 showing the portion of coffee 41 inside the coffee holder 30h and the holder lid 32d with the insertable portion inserted into the coffee holder base 31a is shown in FIG. 34B. The filter paper 40 extends up above the O-ring 50 and the O-Ring 50 cooperates with the holder lid 32d to sandwich the top edge of the filter paper 40 for sealing the filter paper 40 to reduce or prevent the coffee 41 from escaping when the flow of hot water is provided to the coffee holder 30h. The holder base 31a is preferably cylindrical but may also be conical in shape.

Figures 35, 36A, 36B:
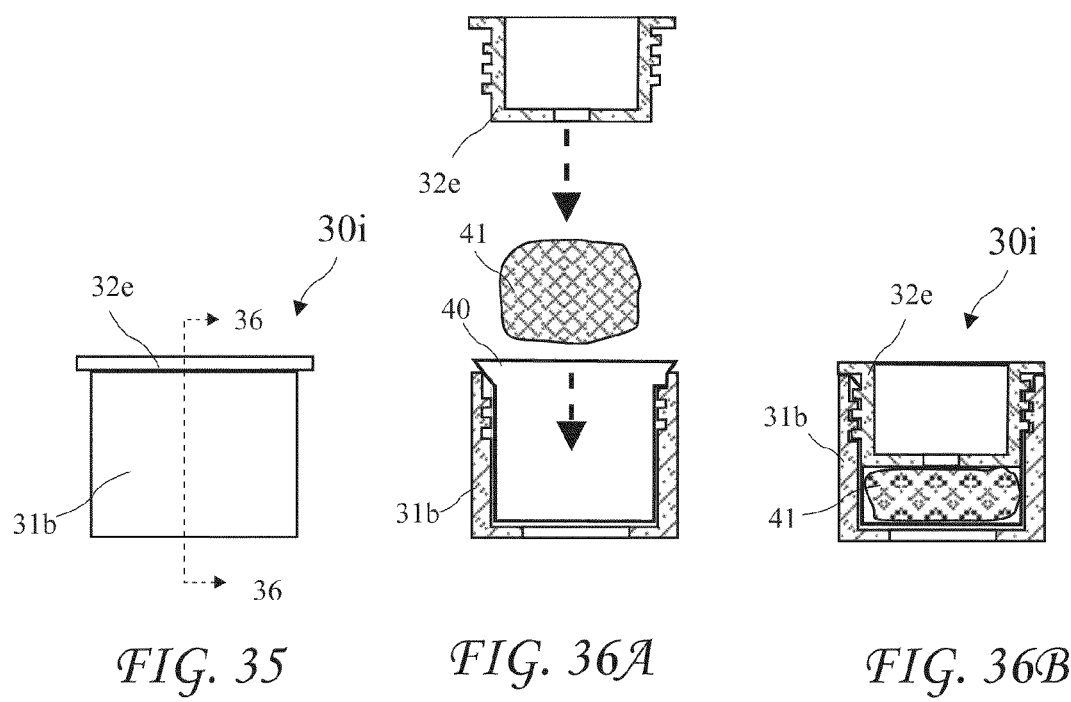
FIG. 35 is a side view of a ninth coffee holder according to the present invention.
FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.
FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

A side view of a ninth coffee holder 30i according to the present invention is shown in FIG. 35, a cross-sectional side view of the ninth coffee holder 30i taken along line 36-36 of FIG. 35 showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h. The holder base 31b is preferably cylindrical to facilitate having internal threads, and at least the threaded portion is preferably cylindrical.

A third coffee maker 10c having a coffee holder 30 according to the present invention for receiving a portion of coffee and a tamping spring 36 for tamping the coffee is shown in FIG. 37A, the third coffee maker 10c with the coffee holder 30 holding the portion of coffee 41 is shown in FIG. 37B, and the third coffee maker 10c with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32a to the holder 30 is preferred in order to prevent coffee grounds from escaping the holder 30, the coffee maker 10c may also be used without the lid 32a and the pad 17 may serve to seal the coffee 41 in the holder 30. In this instance, the coffee maker lid 14 serves as a coffee holder lid.

A third coffee maker 10c having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10c with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10d having a third holder base 31c for receiving a packet 41a containing untamped coffee, a knife 50 for cutting the packet 41a open, and tamping spring 36 under the holder base 31c according to the present invention for tamping the coffee when the coffee maker lid is closed is shown in FIG. 39A, the fourth coffee maker 10d with the holder base 31c holding the packet 41a of untamped coffee is shown in FIG. 39B, and fourth coffee maker with the holder base 31c holding the packet of tamped coffee 41c with the coffee maker lid 14 closed to push the holder base down over the tamping spring 36 for tamping the coffee is shown in FIG. 39C. The coffee maker 10d includes a somewhat pointed nozzle 19a to puncture the packet 41a to provide the flow of hot water to the tamped coffee in the packet 41a. Known coffee packets include internal filters to allow a flow of hot water through the packet to make the coffee drink while preventing coffee grounds from escaping. The cut in the packet 41a made by the knife 50 allows the coffee drink to escape from the packet while filter material in the packet 41a prevent coffee grounds from escaping. The tamping spring 36 may also be attached to the lid 14 as in FIGS. 38A-38C.

The packet 41a may be an air tight pod containing coffee in filter paper and positioning the knife on the side of the holder base 31c results in less likelihood of the knife 50 cutting the filter paper. The packet 41a is preferably air tight to maintain coffee freshness and may be plastic, metal foil, or other air tight material which is sufficiently flexible to allow the coffee contained in the packet 41a to be tamped. Alternatively, the knife 50 may be eliminated when the packet 41a is configured to burst under pressure to expose the coffee, for example, when the coffee maker tamps the coffee, the packet 41a also bursts. In one embodiment, filter paper 41 is inserted into the holder base 31c without the knife 50, and the packet 41a bursts during compacting to release the coffee into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the coffee contained in the cup or capsule.

A fifth coffee maker 10e for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10d may alternatively include a tamping spring entering the coffee holder top, or a resilient solid block pushed into the coffee holder 30 to tamp the coffee. Preferably, a horizontal ram 42a is actuated when the lid 14 is closed and pushed the coffee holder 30 against the spring 36 to tamp the coffee. The horizontal ram 42a may actuated by an electrical solenoid, by pressure, or by mechanical levers connected to the lid 14. The fifth coffee maker 10e may further include any of the features described above for other embodiments of the coffee maker according to the present invention and may be configured to use any of the coffee holders described above according to the present invention.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments described above may be mixed to provide new embodiments and such new embodiments are intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. Apparatus for tamping coffee, the apparatus comprising:
   a coffee holder for receiving a portion of untamped coffee;
   a bottom tamper residing in a bottom of the coffee holder below the untamped coffee;
   a tamper spring attached to the bottom tamper and extending out of the bottom of the holder;
   a holder lid closing a top of the coffee holder after receiving the untamped coffee in the coffee holder;
   a coffee maker comprising:
      a coffee maker lid openable to expose a coffee holder cavity and cooperating with the coffee holder to tamp the untamped coffee inside the coffee holder; and
      a hot water nozzle attached to the coffee maker for providing a flow of hot water to the tamped coffee to make a coffee drink,
   wherein in a closed position the coffee maker lid holds the coffee holder down into the holder cavity and pushes the bottom tamper and tamper spring into the coffee holder to tamp the coffee between the bottom tamper and the holder lid.

2. The apparatus for tamping coffee of claim 1, wherein the coffee holder receives the untamped coffee and is inserted into the coffee holder cavity while holding the untamped coffee.

3. The apparatus for tamping coffee of claim 1, wherein the coffee holder receives the untamped coffee while residing in the coffee holder cavity.

4. Apparatus for tamping coffee, the apparatus comprising:
   a coffee holder for receiving a portion of untamped coffee;
   a holder lid closing the coffee holder after receiving the untamped coffee in the coffee holder;
   a tamper residing inside the coffee holder and limiting the portion of the coffee holder interior accessible by the untamped coffee; and
   a coffee maker comprising:
      a coffee maker lid openable to position the coffee holder inside the coffee maker;
      a coffee holder cavity under the coffee maker lid for receiving the coffee holder;
      the coffee maker lid configured, to upon closing the coffee maker lid, to cooperate with the coffee holder to urge the tamper towards the untamped coffee to reduce the vertical space occupied by the untamped coffee inside the holder to tamp the coffee; and
      a hot water nozzle attached to the coffee maker for providing a flow of hot water to the tamped coffee to make a coffee drink.

5. The apparatus for tamping coffee of claim 4, wherein the tamper resides above the untamped coffee.

6. The apparatus for tamping coffee of claim 5, wherein a spring resides above the tamper and the coffee maker lid pushes the spring and tamper down against the untamped coffee tamping the untamped coffee.

7. The apparatus for tamping coffee of claim 4, wherein the tamper resides under the untamped coffee.

8. The apparatus for tamping coffee of claim 7, wherein a spring resides between the tamper and a floor of the coffee holder cavity, and the coffee maker lid pushes the holder down against the spring urging the tamper against the untamped coffee tamping the untamped coffee.

9. Apparatus for tamping coffee, the apparatus comprising:
   a coffee holder for receiving a portion of untamped coffee;
   a holder lid closing the coffee holder after receiving the untamped coffee into the coffee holder;
   a top tamper residing in the top of the coffee holder above the untamped coffee;
   a tamper spring residing above the top tamper and extending out a top of the coffee holder through the holder lid;
   a coffee maker comprising:
      a coffee maker lid openable to expose a coffee holder cavity and cooperating with the coffee holder to tamp the untamped coffee inside the coffee holder; and
      a hot water nozzle attached to the coffee maker for providing a flow of hot water to the tamped coffee to make a coffee drink,
   wherein closing the coffee maker lid pushes the tamper spring and top tamper down into the coffee holder to tamp the coffee between the top tamper and the coffee holder.

10. The apparatus for tamping coffee of claim 9, wherein the coffee holder receives the untamped coffee and is inserted into the coffee holder cavity while holding the untamped coffee.

11. The apparatus for tamping coffee of claim 9, wherein the coffee holder receives the untamped coffee while residing in the coffee holder cavity.

12. Apparatus for tamping coffee, the apparatus comprising:
   a coffee holder receiving a portion of untamped coffee;
   a holder lid closing the coffee holder after receiving the untamped coffee in the coffee holder; and
   a coffee maker comprising:
      a coffee holder cavity for receiving the coffee holder;
      a coffee maker lid openable to expose a coffee holder cavity;
      a tamper spring residing in the coffee holder cavity under the coffee holder below the untamped coffee, and closing the coffee maker lid pushes the coffee holder down into the holder cavity and pushes the tamper spring into the coffee holder to tamp the coffee between the tamper spring and the holder lid; and
      a hot water nozzle attached to the coffee maker for providing a flow of hot water to the tamped coffee to make a coffee drink.

13. The apparatus for tamping coffee of claim 12, wherein a bottom tamper resided inside the coffee holder under the untamped coffee and closing the coffee maker lid pushes the coffee holder down into the holder cavity and pushes the tamper spring into the coffee holder to push the bottom tamper against the untamped coffee to tamp the coffee between the bottom tamper and the holder lid.

14. The apparatus for tamping coffee of claim 12, wherein the coffee holder receives the untamped coffee and is inserted into the coffee holder cavity while holding the untamped coffee.

15. The apparatus for tamping coffee of claim 12, wherein the coffee holder receives the untamped coffee while residing in the coffee holder cavity.

16. Apparatus for tamping coffee, the apparatus comprising:
   a coffee holder receiving a portion of untamped coffee;
   a holder lid closing the coffee holder after receiving the untamped coffee in the coffee holder; and
   a coffee maker comprising:
      a coffee holder cavity for receiving the coffee holder;
      a coffee maker lid openable to expose a coffee holder cavity;
      a tamper spring attached to a bottom surface of the coffee maker lid, and closing the coffee maker lid pushes the tamper spring into the coffee holder to tamp the coffee between the tamper spring and the coffee holder.; and a hot water nozzle attached to the coffee maker for providing a flow of hot water to the tamped coffee to make a coffee drink.

17. The apparatus for tamping coffee of claim 16, wherein a top tamper resided inside the coffee holder between the coffee holder lid and the untamped coffee and closing the coffee maker lid pushes the tamper spring against the top tamper and the top tamper against the untamped coffee to tamp the coffee between the top tamper and the coffee holder.

18. The apparatus for tamping coffee of claim 16, wherein the coffee holder receives the untamped coffee and is inserted into the coffee holder cavity while holding the untamped coffee.

19. The apparatus for tamping coffee of claim 16, wherein the coffee holder receives the untamped coffee while residing in the coffee holder cavity.

20. Apparatus for tamping coffee, the apparatus comprising:
    a coffee holder for receiving a portion of coffee;
    a holder lid closing the coffee holder after receiving the coffee in the coffee holder;
    a tamper residing inside the coffee holder under the coffee and limiting the portion of the coffee holder interior accessible by the coffee; and
    a coffee maker comprising:
        a coffee maker lid openable to position the coffee holder inside the coffee maker;
        a coffee holder cavity having a floor residing under the coffee maker lid for receiving the coffee holder;
        a vertical member reaching upward from the floor of the coffee holder cavity, and upon closing the coffee maker lid, the coffee holder is pressed downward into the coffee holder cavity and the vertical member enters the coffee holder to urge the tamper towards the coffee thereby reducing the vertical space occupied by the coffee inside the holder; and
        a hot water nozzle attached to the coffee maker for providing a flow of hot water to the coffee to make a coffee drink.

21. Apparatus for tamping coffee, the apparatus comprising:
    a coffee maker including a hot water nozzle;
    a reusable coffee holder configured for holding a portion of untamped coffee;
    the coffee holder receivable by the coffee maker allowing a coffee maker user to prepare a single serving of coffee;
    the coffee holder removable from the coffee maker by the coffee maker user after preparing the single serving of coffee for reuse of the coffee holder;
    a bottom tamper residing in a bottom of the coffee holder under the untamped coffee;
    a block residing in the coffee maker under the coffee holder received by the coffee maker;
    after receiving the coffee holder in the coffee maker, the coffee maker configured to urge the coffee holder and the block together to position the bottom tamper into the coffee holder to reduce the space occupied by the untamped coffee inside the coffee holder to tamp the untamped coffee in the coffee holder; and
    the hot water nozzle cooperating with the coffee holder and providing a flow of hot water to the tamped coffee in the coffee holder to make a coffee drink.

22. Apparatus for tamping coffee, the apparatus comprising:
    a coffee maker including a hot water nozzle;
    a reusable coffee holder configured for holding a portion of untamped coffee;
    the coffee holder receivable by the coffee maker allowing a coffee maker user to prepare a single serving of coffee;
    the coffee holder removable from the coffee maker by the coffee maker user after preparing the single serving of coffee for reuse of the coffee holder;
    a bottom tamper residing in a bottom of the coffee holder under the untamped coffee;
    a tamper spring residing under the bottom tamper and extending out of the bottom of the holder; and
    after receiving the coffee holder by the coffee maker, the coffee maker urges the spring upward into the coffee holder, holding the bottom tamper against the untamped coffee to reduce the space occupied by the untamped coffee inside the coffee holder to tamp the untamped coffee in the coffee holder; and
    the hot water nozzle cooperating with the coffee holder and providing a flow of hot water to the tamped coffee in the coffee holder to make a coffee drink.

23. Apparatus for tamping coffee, the apparatus comprising:
    a coffee maker including a hot water nozzle;
    a reusable coffee holder configured for holding a portion of untamped coffee;
    the coffee holder receivable by the coffee maker allowing a coffee maker user to prepare a single serving of coffee;
    the coffee holder removable from the coffee maker by the coffee maker user after preparing the single serving of coffee for reuse of the coffee holder;
    a top tamper residing in a top portion of the coffee holder above the untamped coffee;
    a tamper spring resides above the top tamper and extends out of the top of the coffee holder; and
    after receiving the coffee holder by the coffee maker, the coffee maker pushes the tamper spring and the top tamper down into the coffee holder to reduce the space occupied by the untamped coffee inside the coffee holder to tamp the untamped coffee in the coffee holder; and
    the hot water nozzle cooperating with the coffee holder and providing a flow of hot water to the tamped coffee in the coffee holder to make a coffee drink.

24. Apparatus for tamping coffee, the apparatus comprising:
    a coffee maker including a hot water nozzle;
    a reusable coffee holder configured for holding a portion of untamped coffee;
    the coffee holder receivable by the coffee maker allowing a coffee maker user to prepare a single serving of coffee;
    the coffee holder removable from the coffee maker by the coffee maker user after preparing the single serving of coffee for reuse of the coffee holder;
    the coffee maker includes a ram aligned with the coffee holder received by the coffee maker; and
    after receiving the coffee holder by the coffee maker, the ram advances toward the coffee holder to cooperate with a tamper to reduce the space occupied by the untamped coffee inside the coffee holder to tamp the untamped coffee in the coffee holder; and
    the hot water nozzle cooperating with the coffee holder and providing a flow of hot water to the tamped coffee in the coffee holder to make a coffee drink.

25. The apparatus of claim 24, wherein:
the coffee holder is received horizontally by the coffee maker;
the ram is a horizontal ram horizontally aligned with the coffee holder received by the coffee maker; and
after receiving the coffee holder by the coffee maker, the horizontal ram advances toward the coffee holder to cooperate with the tamper to reduce the space occupied by the untamped coffee inside the coffee holder to tamp the untamped coffee in the coffee holder.

26. Apparatus for tamping coffee, the apparatus comprising:
a coffee maker including a hot water nozzle;
a reusable coffee holder configured for holding a portion of untamped brewing material, the reusable coffee holder comprising:
a reusable coffee holder base having an interior for receiving the brewing material;
a reusable coffee holder lid;
the coffee holder lid attachable to the coffee holder base while the coffee holder is separated from the coffee maker, to retain brewing material in the coffee holder while the coffee holder is separated from the coffee maker; and
the coffee holder lid removable from the coffee holder base after removing the coffee holder from the coffee maker, to allow removing used brewing material from the coffee holder after removing the coffee holder from the coffee maker;
the coffee holder receivable by the coffee maker allowing a coffee maker user to prepare a single serving of brewed drink;
the coffee holder removable from the coffee maker by the coffee maker user after preparing the single serving of brewed drink for reuse of the coffee holder;
a tamper insertable into the coffee maker with the coffee holder and removable from the coffee maker with the coffee holder, wherein the coffee maker is configured upon receiving the coffee holder, to cooperate with the coffee holder to position the tamper towards the untamped brewing material to reduce the space occupied by the untamped brewing material inside the coffee holder to tamp the untamped brewing material; and
the hot water nozzle cooperating with the coffee holder and providing a flow of hot water to the tamped brewing material in the coffee holder to make a brewed drink.

27. The apparatus for tamping coffee of claim 26, wherein the tamper resides in the interior of the coffee holder.

28. The apparatus for tamping coffee of claim 26, wherein:
a block resides in the coffee maker; and
the coffee maker is configured upon receiving the coffee holder, to cooperate with the coffee holder to urge the coffee holder and the block together to position the tamper towards the untamped brewing material to reduce the space occupied by the untamped brewing material inside the coffee holder to tamp the untamped brewing material.

29. The apparatus for tamping coffee of claim 26, wherein:
a spring resides in the coffee maker; and
the coffee maker is configured upon receiving the coffee holder, to cooperate with the coffee holder to urge the coffee holder and the spring together to position the tamper towards the untamped brewing material to reduce the space occupied by the untamped brewing material inside the coffee holder to tamp the untamped brewing material.

30. Apparatus for tamping coffee, the apparatus comprising:
a coffee maker including a hot water nozzle;
a reusable coffee holder configured for holding a portion of untamped brewing material, the reusable coffee holder comprising:
a reusable coffee holder base having an interior for receiving the brewing material;
a reusable coffee holder lid;
the coffee holder lid attachable to the coffee holder base while the coffee holder is separated from the coffee maker, to retain brewing material in the coffee holder while the coffee holder is separated from the coffee maker; and
the coffee holder lid removable from the coffee holder base after removing the coffee holder from the coffee maker, to allow removing used brewing material from the coffee holder after removing the coffee holder from the coffee maker;
the coffee holder receivable by the coffee maker allowing a coffee maker user to prepare a single serving of brewed drink; and
the coffee holder removable from the coffee maker by the coffee maker user after preparing the single serving of brewed drink for reuse of the coffee holder; and
the hot water nozzle cooperating with the coffee holder and providing a flow of hot water to the tamped brewing material in the coffee holder to make a brewed drink;
wherein:
the brewing material resides in a filter material cup inside the coffee holder; and
the coffee maker is configured upon receiving the coffee holder, to cooperate with the coffee holder to press against the filter material cup to reduce the space occupied by the untamped brewing material inside the coffee holder to tamp the untamped brewing material.

* * * * *